(12) United States Patent
Teng et al.

(10) Patent No.: US 10,371,878 B1
(45) Date of Patent: Aug. 6, 2019

(54) LIGHT REGULATION DEVICE FOR LIGHT DEFLECTION AND BACKLIGHT MODULE HAVING THE SAME

(71) Applicant: National Taiwan Normal University, Taipei (TW)

(72) Inventors: Tun-Chien Teng, Taipei (TW); Chun-Hao Sun, Taipei (TW); Sheng-Guo Xu, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 16/129,352

(22) Filed: Sep. 12, 2018

(30) Foreign Application Priority Data

Mar. 27, 2018 (TW) .............................. 107110438 A

(51) Int. Cl.
*F21V 8/00* (2006.01)

(52) U.S. Cl.
CPC ......... *G02B 6/0025* (2013.01); *G02B 6/0023* (2013.01); *G02B 6/0026* (2013.01); *G02B 6/0031* (2013.01); *G02B 6/0053* (2013.01); *G02B 6/005* (2013.01)

(58) Field of Classification Search
CPC .. G02B 6/0025; G02B 6/0053; G02B 6/0031; G02B 6/0023; G02B 6/0026; G02B 6/005
See application file for complete search history.

(56) References Cited

U.S. PATENT DOCUMENTS

| 2007/0247872 | A1* | 10/2007 | Lee | ...................... | G02B 6/0025 362/616 |
| 2009/0316431 | A1* | 12/2009 | Nagata | ................. | G02B 6/0028 362/609 |
| 2014/0192550 | A1* | 7/2014 | De Zwart | ............ | G02B 6/0028 362/558 |
| 2016/0147000 | A1* | 5/2016 | Yoon | ...................... | G02B 6/005 362/606 |
| 2017/0199406 | A1* | 7/2017 | Wang | ..................... | G02F 1/1393 |
| 2018/0032030 | A1* | 2/2018 | Kim | ....................... | G02B 6/0031 |
| 2018/0156962 | A1* | 6/2018 | Kim | ....................... | G02B 6/0031 |
| 2019/0101793 | A1* | 4/2019 | Takase | .............. | G02F 1/133603 |

* cited by examiner

*Primary Examiner* — Donald L Raleigh
(74) *Attorney, Agent, or Firm* — Birch, Stewart, Kolasch & Birch, LLP

(57) ABSTRACT

A light regulation device includes a first light guide structure having an incident light, a second light guide structure having a light emitting surface, and a light deflection sheet having a first light deflection layer. All or a portion of the incident light is guided by the first light guide structure toward the light deflection sheet, is then deflected at least by the first light deflection layer to travel to the second light guide structure so as to be guided by the same to emit through the light emitting surface. The other portion of the incident light is guided by the first light guide structure toward the second light guide structure, and is then guided by the second light guide structure to emit through the light emitting surface.

23 Claims, 33 Drawing Sheets

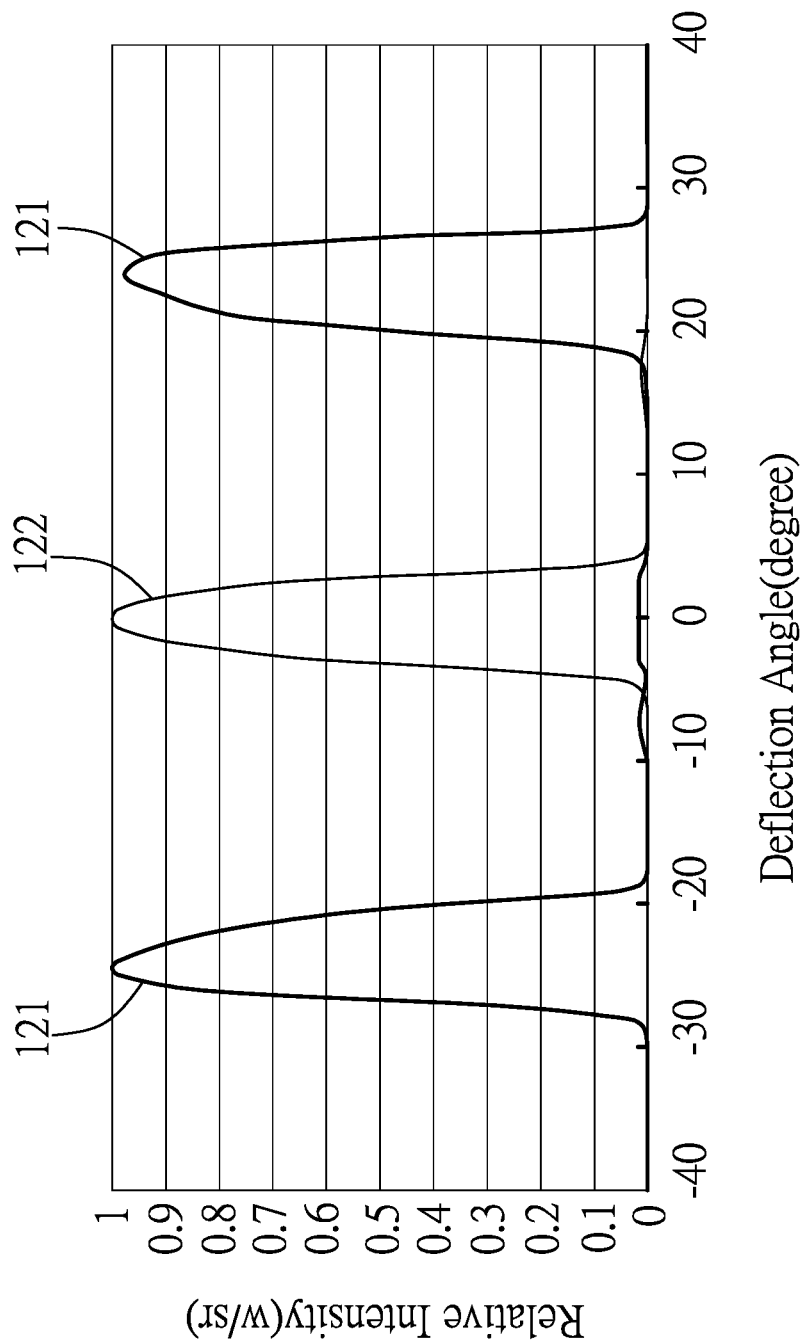
F I G. 12

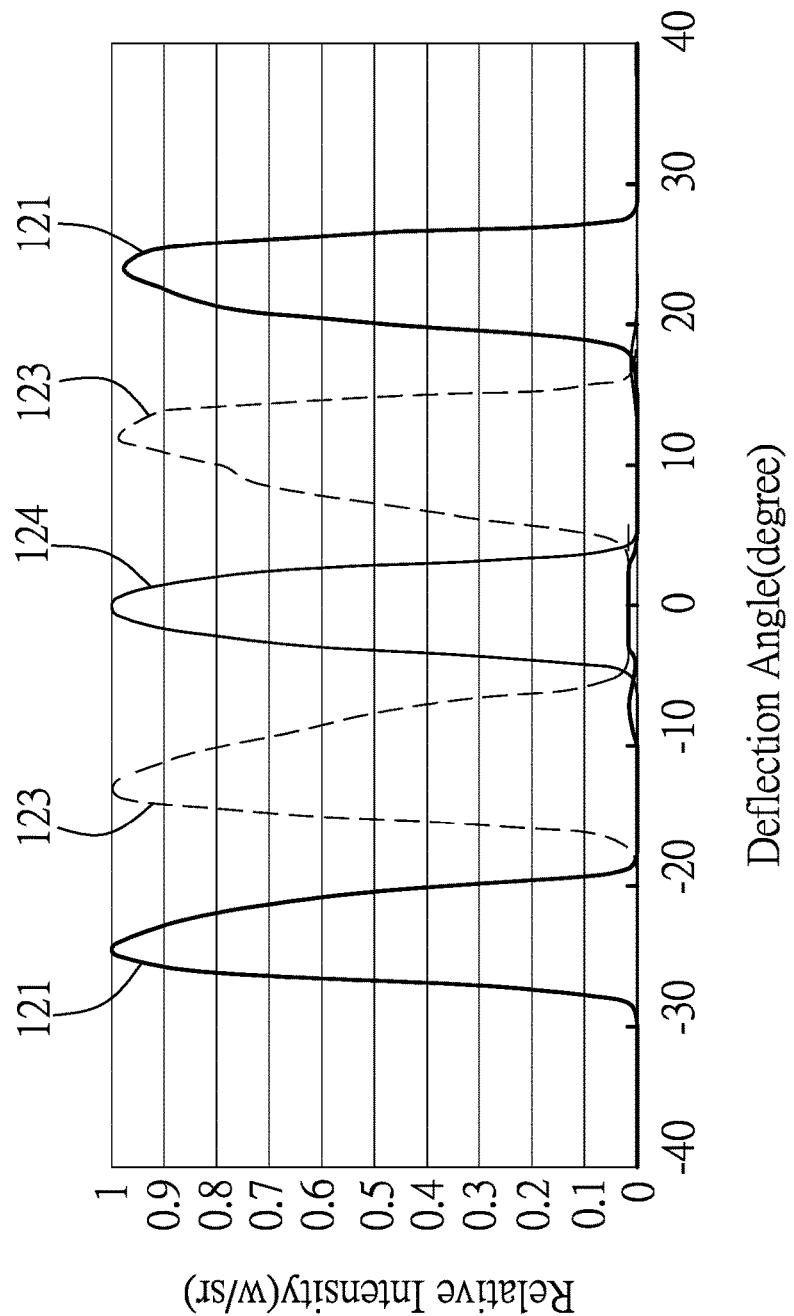
F I G. 22

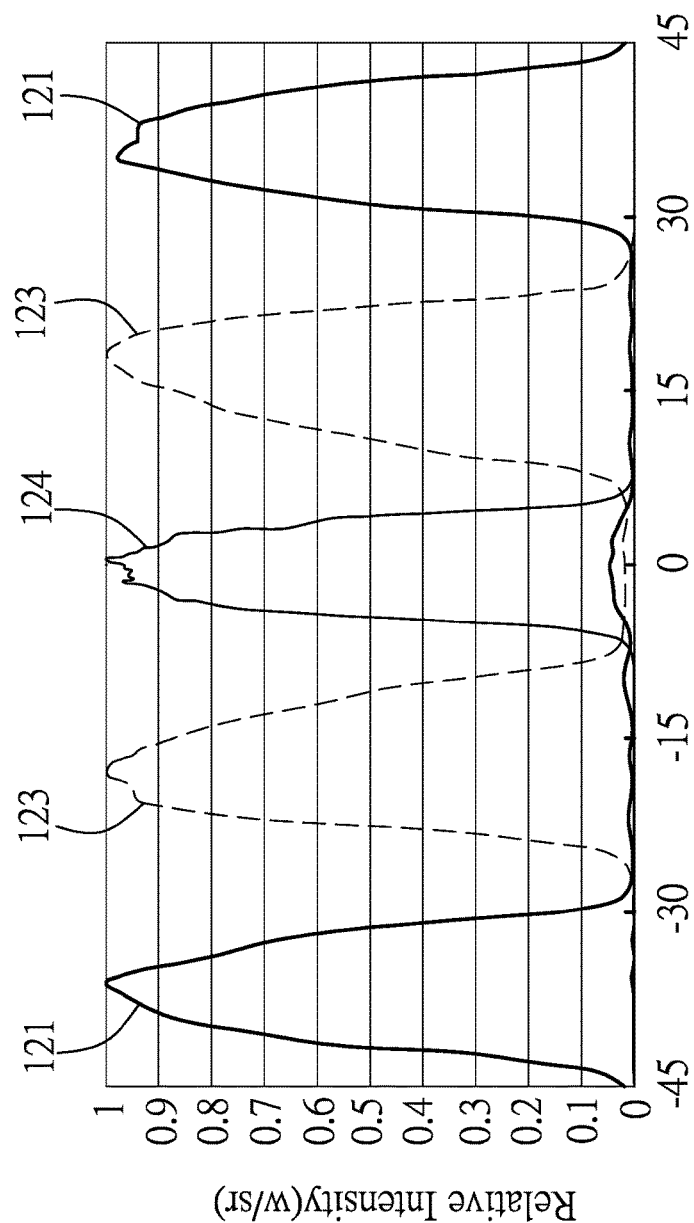
F I G. 24

LIGHT REGULATION DEVICE FOR LIGHT DEFLECTION AND BACKLIGHT MODULE HAVING THE SAME

CROSS-REFERENCE TO RELATED APPLICATION

This application claims priority to Taiwanese Application No. 107110438, filed on Mar. 27, 2018.

FIELD

The disclosure relates to a light regulation device, more particularly to a light regulation device for light deflection and a backlight module having the light regulation device.

BACKGROUND

In an existing backlight module, a light guide plate is usually used to convert a plurality of point light sources or a linear light source into a surface light source. By providing a plurality of microstructures having different density distributions on a side surface of such light guide plate to reflect and/or refract incident light, output light can be emitted as a surface light source through a light exit surface thereof. However, the angular intensity distribution of any light ray emitted from the light exit surface of such light guide plate may present a normal (Gaussian) distribution. Thus, when such light ray is used as a light point of the surface light source, the angular intensity of each light point in the surface light source provided by the existing backlight module may not be uniform. Therefore, there is still room for improvement of the existing backlight module.

SUMMARY

Therefore, an object of the present disclosure is to provide a light regulation device that is capable of providing various light deflections.

Accordingly, a light regulation device of this disclosure includes a first light guide structure, a second light guide structure and a light deflection sheet. The first light guide structure has a light incident surface on which light in a first direction is incident as incident light. The second light guide structure is opposite to the first light guide structure in a second direction, which is perpendicular to the first direction, and has a light emitting surface. The light deflection sheet is clamped between the first and second light guide structures and extends in a third direction perpendicular to the first and second directions. The light deflection sheet includes a first light deflection layer.

All or a portion of the incident light is guided by the first light guide structure toward the light deflection sheet, is then deflected at least by the first light deflection layer to travel to the second light guide structure, and is substantially guided by the second light guide structure to emit through the light emitting surface.

When the portion of the incident light is guided by the first light guide structure toward the light deflection sheet, the other portion of the incident light is guided by the first light guide structure toward the second light guide structure, and is then guided by the second light guide structure to emit through the light emitting surface.

Another object of the present disclosure is to provide a backlight module having a light regulation device that is capable of alleviating at least one of the drawbacks of the prior art.

Accordingly, a backlight module of this disclosure includes a light supply unit, a light guide plate and a light regulation device. The light supply unit is configured to produce incident light in a first direction. The light guide plate is opposite to the light supply unit in a second direction perpendicular to the first direction, and has a light entry end surface, a light exit side surface distal from the light supply unit in the second direction, and a light guide side opposite to the light exit side surface in the second direction and adjacent to the light supply unit and formed with a plurality of interconnected sawtooth-shaped ridges that are arranged in the first direction and that extend in a third direction perpendicular to the first and second directions.

The light regulation device includes a first light guide structure having a light incident surface attached to the light supply unit for receiving the incident light produced thereby, a second light guide structure opposite to the first light guide structure in the second direction and having a light emitting surface attached to the light entry end surface of the light guide plate, and a light deflection sheet clamped between the first and second light guide structures and extending in the third direction. The light deflection sheet includes a first light deflection layer.

All or a portion of the incident light is guided by the first light guide structure toward the light deflection sheet, is then deflected at least by the first light deflection layer to travel to the second light guide structure, and is substantially guided by the second light guide structure to emit through the light emitting surface so as to enter the light entry end surface of the light guide plate.

When the portion of the incident light is guided by the first light guide structure toward the light deflection sheet, the other portion of the incident light is guided by the first light guide structure toward the second light guide structure, and is then guided by the second light guide structure to emit through the light emitting surface so as to enter the light entry end surface of the light guide plate.

All or most of the incident light regulated by the light regulation device in deflection with respect to the first direction and entering the light entry end surface of the light guide plate is guided by the light guide plate so as to emit a surface light source from the light exit side surface.

BRIEF DESCRIPTION OF THE DRAWINGS

Other features and advantages of the disclosure will become apparent in the following detailed description of the embodiments with reference to the accompanying drawings, of which:

FIG. 12 is a simulated characteristic diagram showing an angular intensity distribution, in a Z-Y plane, of light emitted from the light regulation device of the first embodiment;

FIG. 22 is a simulated characteristic diagram showing an angular intensity distribution, in a Z-Y plane, of light emitted from the light regulation device of the second embodiment;

FIG. 24 is a simulated characteristic diagram showing an angular intensity distribution, in a Y-X plane, of light emitted from the light guide plate of the second embodiment;

DETAILED DESCRIPTION

Figure 1:
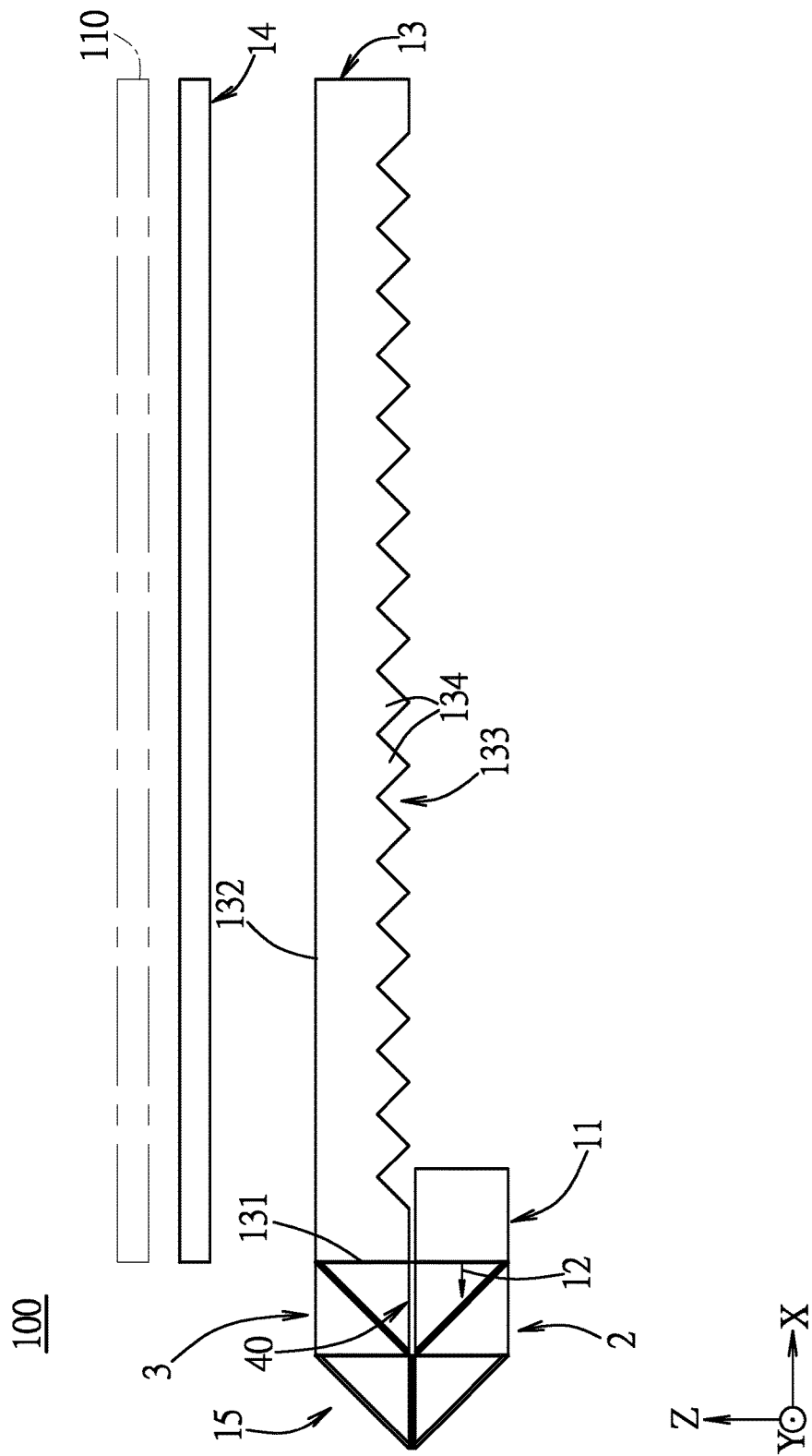
FIG. 1 is a schematic side view, in a Y-direction, of a backlight module according to the first embodiment of this disclosure.

Before the present disclosure is described in greater detail with reference to the accompanying embodiments, it should be noted herein that like elements are denoted by the same reference numerals throughout the disclosure.

Referring to FIGS. 1 to 14, a backlight module 100 according to the first embodiment of the present disclosure is used to provide backlight for a liquid crystal display (LCD) panel 110. The backlight module 100 may be embodied as a side-light type backlight module, and includes a light supply unit 11, a light guide plate 13, an optical lens 14 and a light regulation device 15.

Figure 2:
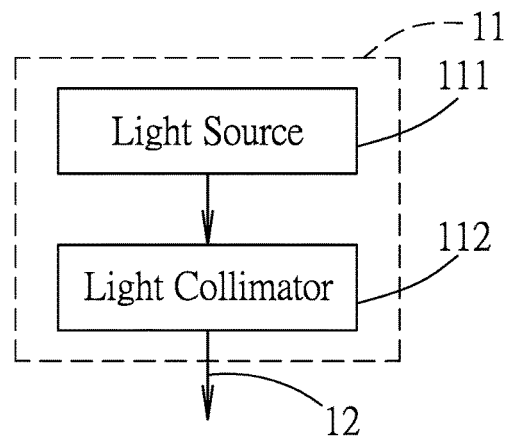
FIG. 2 is a schematic block diagram of a light supply unit of the first embodiment.

The light supply unit 11 may serve as a linear light source for producing linear light, and includes a light source 111 and a light collimator 112 in this embodiment (see FIG. 2). The light source 111 may be a light-emitting unit including a plurality of light-emitting diodes or a cold cathode lamp. The light collimator 112 is configured to collimate such as visible light produced by the light source 111 to form an input light beam in a first direction, for example, but not limited to, an X-direction. It is noted that the light source 111 and the light collimator 112 may cooperatively constitute a light beam generator for generating the input light beam in the X-direction.

The light guide plate 13 is opposite to the light supply unit 11 in a second direction perpendicular to the X-direction, for example, but not limited to, a Z-direction, and has a light entry end surface 131, a light exit side surface 132 distal from the light supply unit 11 in the Z-direction, and a light guide side 133 opposite to the light exit side surface 132 in the Z-direction and adjacent to the light supply unit 11. The light guide plate 13 may be designed in a known manner that the light guide side 133 is formed with a plurality of interconnected sawtooth-shaped ridges 134 that are arranged in the X-direction and that extend in a third direction perpendicular to the X- and Z-directions, for example, but not limited to, a Y-direction.

The optical lens 14 is disposed between the light exit side surface 132 of the light guide plate 13 and the LCD panel 110, and is spaced apart from the light exit side surface 132 of the light guide plate 13.

Figure 3:
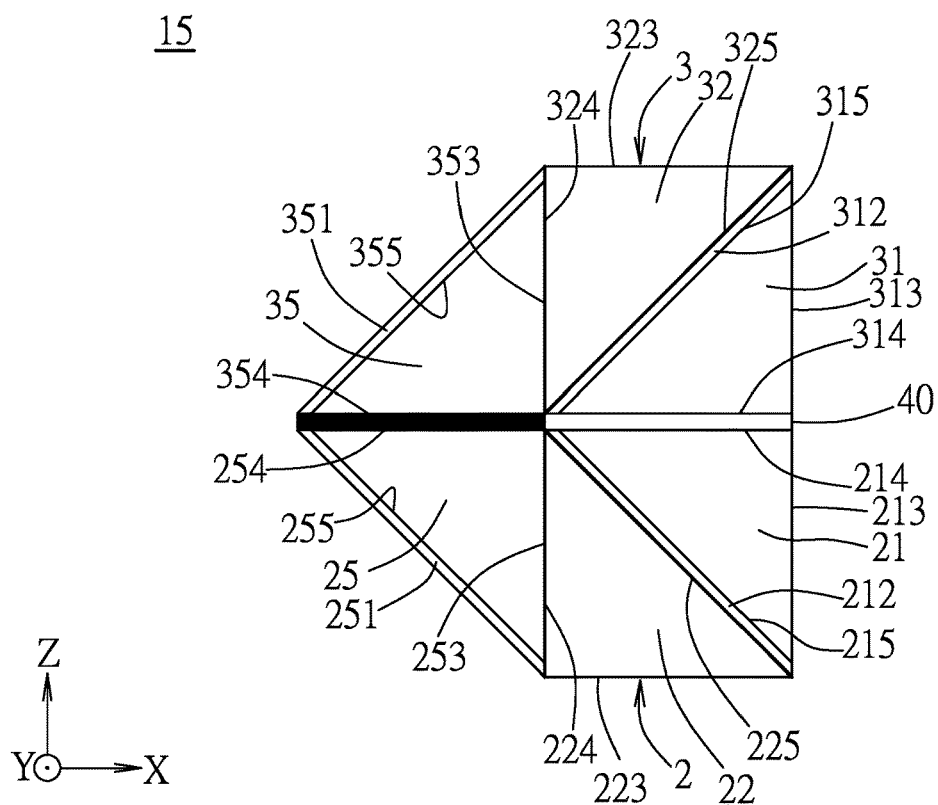
FIG. 3 is a schematic side view, in the Y-direction, of a light regulation device of the first embodiment.
Figure 4:
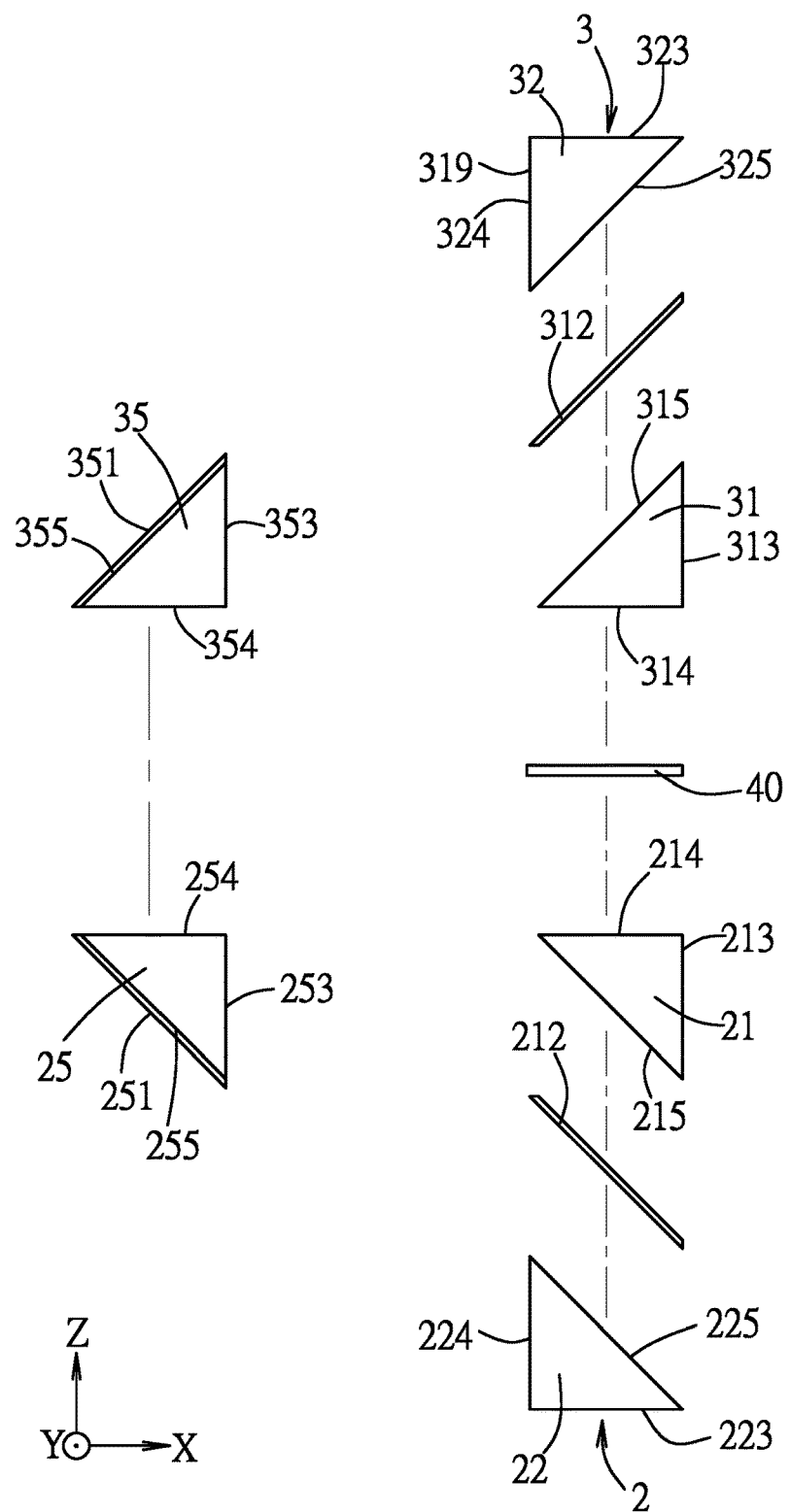
FIG. 4 is an exploded schematic side view, in the Y-direction, of the light regulation device of the first embodiment without any optical adhesive.

With reference to FIGS. 1, 3 and 4, the light regulation device 15 includes a first light guide structure 2, a second light guide structure 3 opposite to the first light guide structure 2 in the Z-direction, and a light deflection sheet 40 clamped between the first and second light structures 2, 3 and extending in the Y-direction.

The first light guide structure 2 has a light incident surface perpendicular to the X-direction and bonded with the light collimator 112 by an optical adhesive (indicated by the thick black line in FIG. 1) without any air gap therebetween so that the input light beam from the light collimator 112 is incident on the light incident surface as incident light 12.

In this embodiment, the first light guide structure 2 may include first, second and third prisms 21, 22, 25 arranged in the X-direction and extending in the Y-direction, a first planar light splitter element 212, and a first planar light reflection element 251. The first, second and third prisms 21, 22, 25 are the same isosceles right triangular prism made of a transparent material, such as polycarbonate (PC), polymethyl methacrylate (PMMA) or glass. Each of the first, second and third prisms 21, 22, 25 has a first side surface 213, 223, 253 and a second side surface 214, 224, 254 forming a right angle therebetween, and a third side surface 215, 225, 255 that interconnects the first side surface 213, 223, 253 and the second side surface 214, 224, 254, that is opposite to the right angle and that is inclined with respect to the light deflection sheet 40. The first and second prisms 21, 22 are stacked on each other in the Z-direction in a manner that the third side surfaces 215, 225 thereof face each other. The first side surface 213 of the first prism 21 serves as the light incident surface of the first light guide structure 2. It is noted that the optical adhesive bonding the light incident surface 213 and the light collimator 112 has a refractive index close to or lower than that of the first prism 21, thereby minimizing the loss of the incident light 12 incident on the light incident surface 213. The second side surface 214 of the first prism 21 faces the light deflection sheet 40. The second side surface 224 of the second prism 22 is adhered to the first side surface 253 of the third prism 25 by an optical adhesive (indicated by the thick black line) having a refractive index close to or lower than that of the third prism 25.

The first planar light splitter element 212 is disposed adjacent to the light incident surface 213 in the X-direction, and is positioned in a manner that the first planar light splitter element 212 is inclined so as to be closer to the light deflection sheet 40 as being farther from the light incident surface 213. In this embodiment, the first planar light splitter element 212 is a dichroic splitting film coated over the third side surface 215 of the first prism 21, and may be used to reflect, for example, but not limited to, blue light. However, in other embodiments, the first planar light splitter element 212 can be used to reflect red light or green light. The first planar light splitter element 212 is adhered to the third side surface 225 of the second prism 22 by an optical adhesive (indicated by the thick black line in FIG. 3) having the same refractive index as that of the first and second prisms 21, 22.

The first planar light reflection element 251 is disposed distal from the light incident surface 213 in the X-direction, and is positioned parallel to the first planar light splitter element 212. In this embodiment, the first planar light reflection element 251 may be, but is not limited to, a light reflection film coated over the third side surface 255 of the third prism 25.

The second light guide structure 3 has a light emitting surface perpendicular to the X-direction and bonded with the light entry end surface 131 of the light guide plate 13 by an optical adhesive (indicated by the thick black line in FIG. 1) without any air gap therebetween.

In this embodiment, the second light guide structure 3 has a configuration similar to that of the first light guide structure 2 but symmetrical to the first light guide structure 2 with respect to the light deflection sheet 40 in arrangement. More specifically, the second light guide structure 3 may include first, second and third prisms 31, 32, 35 arranged in the X-direction and extending in the Y-direction, a second planar light splitter element 312, and a second planar light reflection element 351. The first, second and third prisms 31, 32, 35 are identical to the first, second and third prisms 21, 22, 25 of the first light guide structure 2 in this embodiment. Each of the first, second and third prisms 31, 32, 35 has a first side surface 313, 323, 353 and a second side surface 314, 324, 354 forming a right angle therebetween, and a third side surface 315, 325, 355 that interconnects the first side surface 313, 323, 353 and the second side surface 314, 324, 354, that is opposite to the right angle and that is inclined with respect to the light deflection sheet 40. The first and second prisms 31, 32 are stacked on each other in the Z-direction in a manner that the third side surfaces 315, 325 thereof face each other. The first side surface 313 of the first prism 31 serves as the light emitting surface of the second light guide structure 3. It is noted that the optical adhesive bonding the light emitting surface 313 and the light entry end surface 131 of the light guide plate 13 has a refractive index close to or lower than that of the first prism 31, thereby minimizing the loss of light emitted from the light emitting surface 313 and incident on the light entry end surface 131 of the light guide plate 13. The second side surface 314 of the first prism 31 faces the light deflection sheet 40. The second side surface 324 of the second prism 32 is adhered to the first side surface 353 of the third prism 35 by an optical adhesive (indicated by the thick black line in FIG. 3) having a refractive index close to or lower than that of the third prism 35. The second side surface 354 of the third prism 35 is adhered to the second side surface 254 of the third prism 25 of the first light guide structure 2 by an optical adhesive (indicated by the thick black line in FIG. 3) having a refractive index close to or lower than that of the third prisms 25, 35.

The second planar light splitter element 312 is disposed adjacent to the light emitting surface 313 in the X-direction, is similar to the first planar light splitter element 212 in splitting functions, and is positioned in a manner that the second planar light splitter element 312 is inclined so as to be closer to the light deflection sheet 40 as being farther from the light emitting surface 313 and is symmetrical to the first planar light splitter element 212 with respect to the light deflection sheet 40. Similar to the first planar light splitter element 212, the second planar light splitter element 312 is also a dichroic splitting film coated over the third side surface 315 of the first prism 31 and may be used to reflect blue light. The first planar light splitter element 212 is adhered to the third side surface 325 of the second prism 32 by an optical adhesive (indicated by the thick black line in FIG. 3) having the same refractive index as that of the first and second prisms 31, 32.

The second planar light reflection element 351 is disposed distal from the light emitting surface 313 in the X-direction, and is positioned parallel to the second planar light splitter element 312. Further, the second planar light reflection element 351 is symmetrical to the first planar light reflection element 251 with respect to the light deflection sheet 40. In this embodiment, the second planar light reflection element 351 may be, but is not limited to, a light reflection film coated over the third side surface 355 of the third prism 35.

Figure 5:
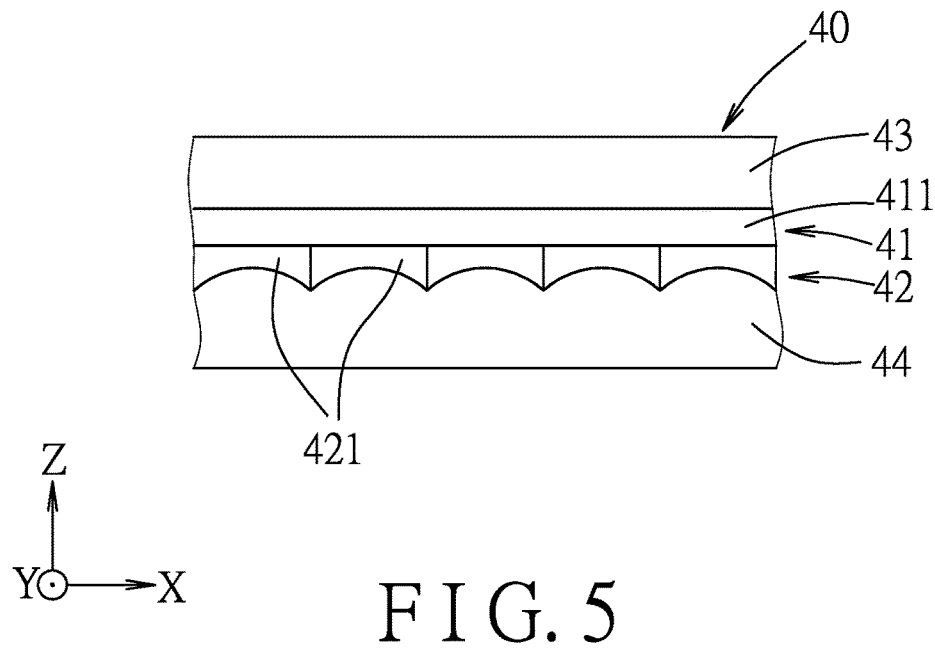
FIG. 5 is an enlarged fragmentary side view, in the Y-direction, of a light deflection sheet of the first embodiment.
Figure 6:
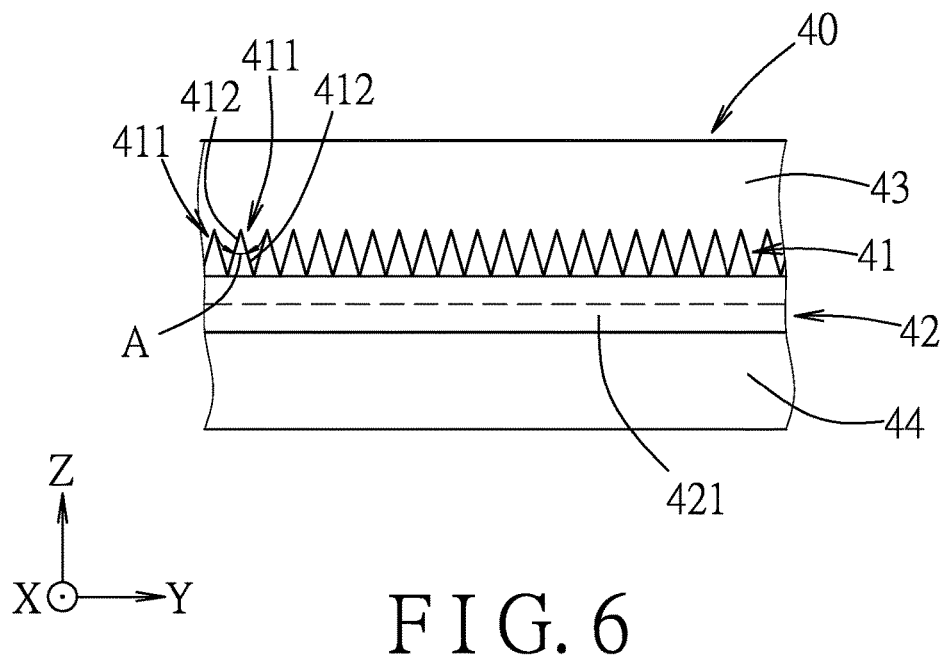
FIG. 6 is an enlarged fragmentary side view, in an X-direction, of the light deflection sheet of the first embodiment.
Figure 7:
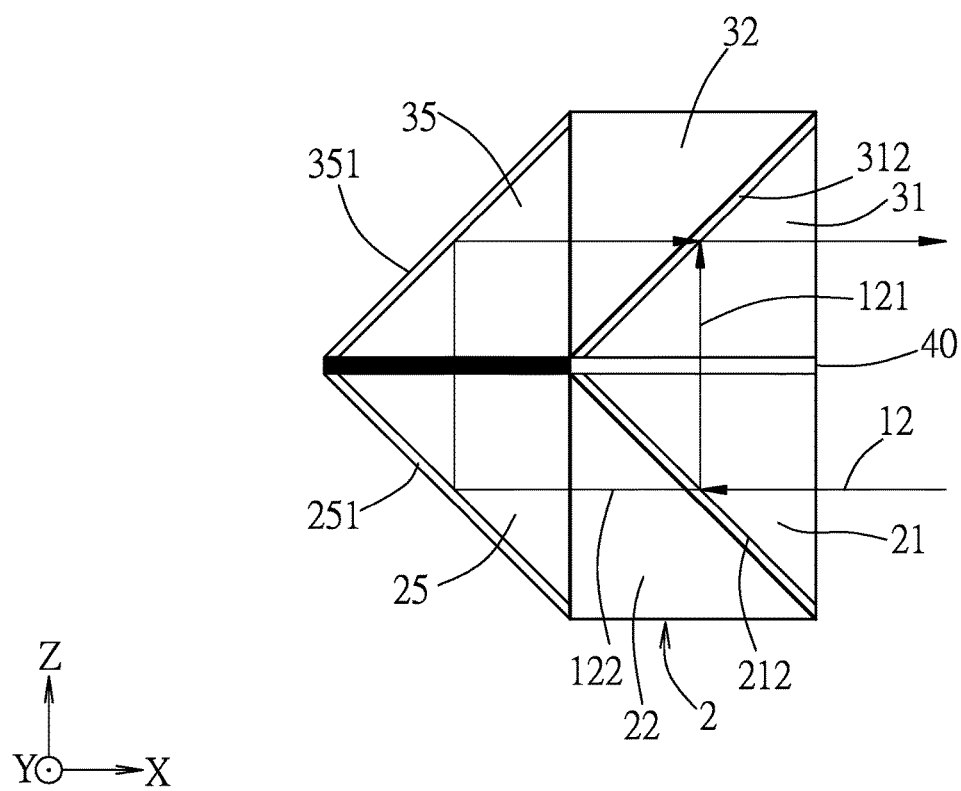
FIG. 7 is a diagram schematically showing light behavior, in the Y-direction, in the light regulation device of the first embodiment.
Figure 8:
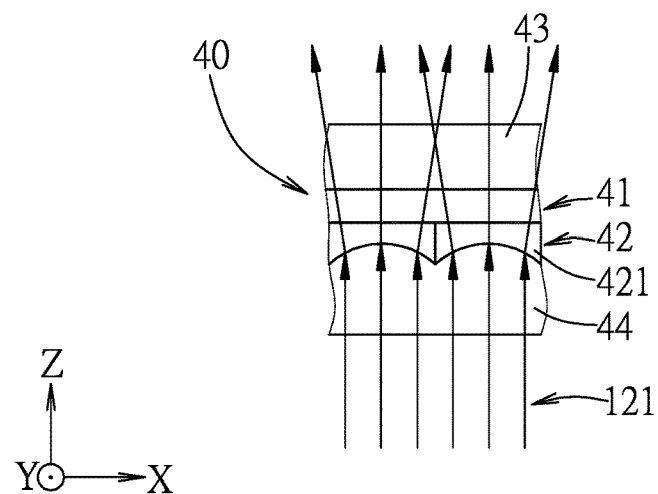
FIG. 8 is a diagram schematically showing light behavior with respect to a second light deflection layer, in the Y-direction, in the light deflection sheet of the first embodiment.

In this embodiment, the light deflection sheet 40 is merely attached between the second side surfaces 214, 314 of the first prisms 21, 31 of the first and second light guide structures 2, 3, as best shown in FIG. 3. With reference to FIGS. 4 to 6, the light deflection sheet 40 may include a first light deflection layer 41 adjacent to the second light guide structure 3, a second light deflection layer 42 attached to the first light deflection layer 41 and adjacent to the first light guide structure 2, a first optical adhesive layer 43 used to be adhered between the first light deflection layer 41 and the second side surface 314 of the first prism 31 of the second light guide structure 3 (not shown in the FIGS.), and a second optical adhesive layer 44 used to be adhered between the second light deflection layer 42 and the second side surface 214 of the first prism 21 of the first light guide structure 2 (not shown in the FIGS.).

Figure 9:
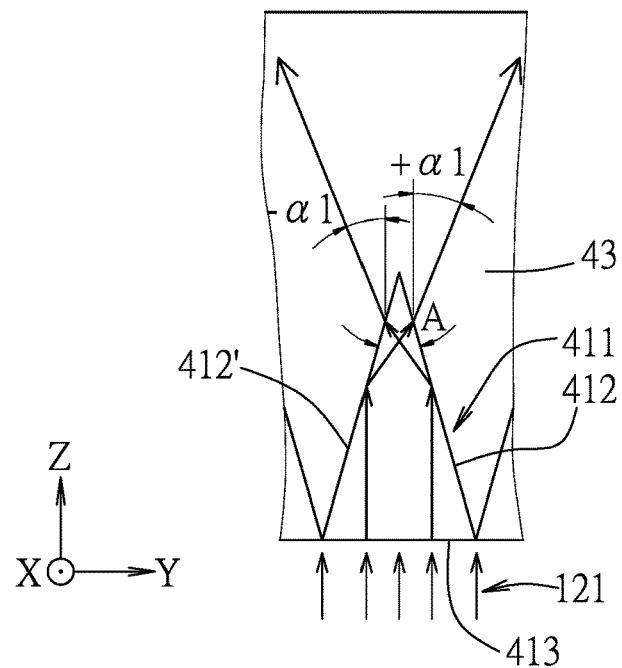
FIG. 9 is a diagram schematically showing light behavior with respect to each saw-toothed microstructure of a first light deflection layer of the first embodiment in the X-direction.

It is noted that, in this embodiment, the first light deflection layer 41 may include a plurality of interconnected saw-toothed microstructures 411 that are arranged in the Y-direction (see FIG. 6). As shown in FIG. 9, each saw-toothed microstructure 411 is an isosceles triangular prism body that extends in the X-direction (see FIG. 5) and that has first and second side surfaces 412, 412' forming an apex angle (A) therebetween, and a third side surface 413 adjacent to the second side surface 214 of the first prism 21 and permitting light incident thereon. The apex angle (A) of each saw-toothed microstructure 411 may be designed as one of a plurality of different angles. In this embodiment, the apex angles (A) of the saw-toothed microstructures 411 are all the same, and the apex angle (A) of each saw-toothed microstructure 411 is an angle ranging from 0° to 180° and is exemplified as 32° in this embodiment.

As shown in FIGS. 5 and 6, the second light deflection layer 42 may include a plurality of interconnected wave-like microstructures 421 arranged in the X-direction, and each wave-like microstructure 421 is a concave lens body extending in the Y-direction. Each of the first and second light deflection layers 41, 42 is made of a transparent material, such as polycarbonate (PC), polymethyl methacrylate (PMMA) or glass. In this embodiment, each of the first and second light deflection layers 41, 42 is made of polymethyl methacrylate (PMMA).

The first optical adhesive layer 43 may be coated over the first light deflection layer 41 to adhere the light deflection sheet 40 to the second side surface 314 of the first prism 31 of the second light guide structure 3 (not shown in FIGS. 5 and 6), and has a refractive index different from that of the first light deflection layer 41. In this embodiment, the refractive index of the first optical adhesive layer 43 may be lower than that of the first light deflection layer 41. If the refractive index of the first optical adhesive layer 43 is, for example, 1.35, the refractive index of the first light deflection layer 41 may range from 1.49 to 1.5. However, in other embodiments, the refractive index of the first optical adhesive layer 43 may be higher than that of the first light deflection layer 41. The second optical adhesive layer 44 may be coated over the second light deflection layer 42 to adhere the light deflection sheet 40 to the second side surface 214 of the first prism 21 of the first light guide structure 2 (not shown in FIGS. 5 and 6). Thus, through the presence of the first and second optical adhesive layers 43, 44, the light deflection sheet 40 can be stably fixed between the first prisms 21, 31 of the first and second light guide structures 2, 3.

With reference to FIGS. 3, and 7 to 11, the light guiding operations of the light regulation device 15 of this embodiment will be described in detail below.

For the first light guide structure 2, the first planar light splitter element 212 is configured to split the incident light 12 into a first light beam 121 and a second light beam 122, to reflect the first light beam 121 in the Z-direction toward the light deflection sheet 40, and to permit passage of the second light beam 122 in the X-direction therethrough. In this embodiment, the first light beam 121 is a light beam of blue light and may be regarded as a portion of the incident light 12, and the second light beam 122 may be regarded as the other portion of the incident light 12. The first planar light reflection element 251 is configured to reflect toward the second light guide structure 3 the second light beam 122 that passes through the first planar light splitter element 212 and the second prism 22 in the Z-direction and enters the third prism 25. Thus, the first light beam 121 reflected by the first planar light splitter element 21 passes through the first prism 21 and is then incident on the second adhesive layer 44, and the second light beam 122 reflected by the first light reflection element 251 passes through the third prism 25 and the corresponding optical adhesive, and is then incident on the second side surface 354 of the third prism 35 of the second light guide structure 3.

For the light deflection sheet 40, the first light beam 121 entering the second light deflection layer 42 is deflected by the wave-like microstructures 421 of the second light deflection layer 42 before it is incident on the third side surfaces 413 of the saw-toothed microstructures 411 of the first light deflection layer 41. After the first light beam 121 passes through the wave-like microstructures 421, the angle distribution range of the first light beam 121 with respect to the Z-direction becomes wider due to refraction (see FIG. 8). Through this, after the first light beam 121 passes through the second light deflection layer 42, it can uniformly irradiate into the first light deflection layer 41.

In the case of the refractive index of the first optical adhesive layer 43 being e.g., 1.35 and the apex angle (A) of each saw-toothed microstructure 411 being e.g., 32°, the refractive index of the first light deflection layer 41 can be appropriately decided so that total internal reflection of one or more light rays of the first light beam 121 occurs at one of the first and second side surfaces 412, 412' of each saw-toothed microstructure 411, and so that the light ray(s) of the first light beam 121 totally reflected is then refracted from the other one of first and second side surfaces 412, 412' of the saw-toothed microstructure 411 at a deflection angle pair (+α1, −α1) with respect to the Z-direction (see FIG. 9). Thus, the first light beam 121 is deflected from the first and second side surfaces 412, 412' of the saw-toothed microstructure 411 toward the first prism 31 at a deflection angle pair (+α1, −α1) with respect to the Z-direction.

From the above, the deflection angle pair (+α1, −α1) is associated with the refractive indices of the first light deflection layer 41 and the first adhesive layer 43, and the apex angle (A) of each saw-toothed microstructure 411. Thus, the first light beam 121 is refracted toward the first prism 31 from the first and second side surfaces 412, 412' of the saw-toothed structures 411 at the deflection angle pair (+α1, −α1) with respect to the Z-direction. In this embodiment, the deflection angle pair (+α1, −α1) is, for example, (+22°, −22°).

Figure 10:
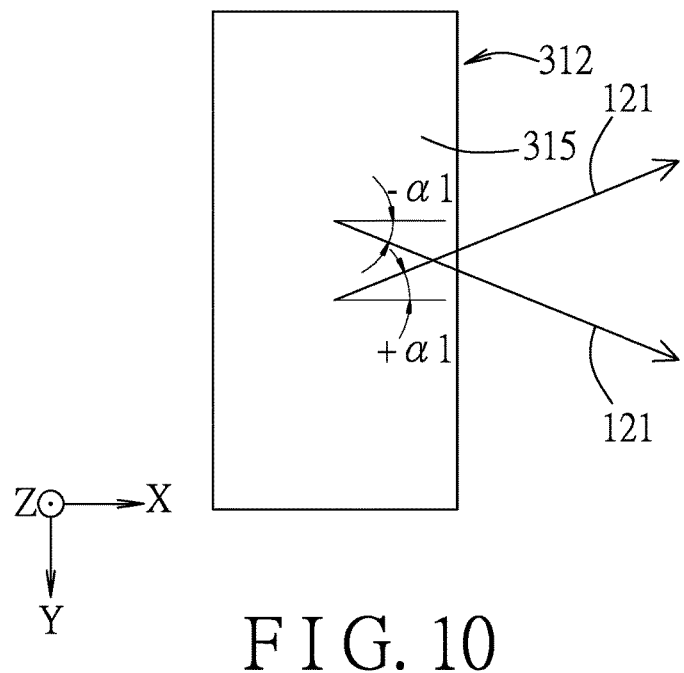
FIG. 10 is a diagram schematically showing light behavior with respect to a second planar light splitter element of the first embodiment in a Z-direction.
Figure 11:
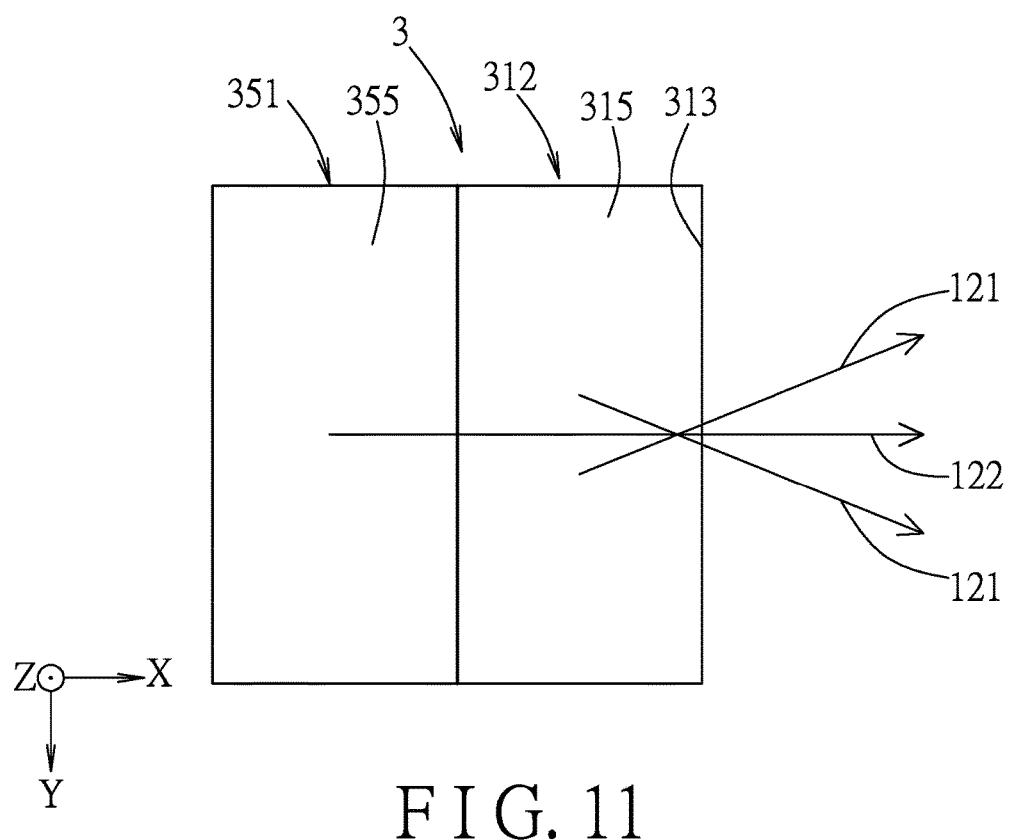
FIG. 11 is a diagram schematically showing light behavior in a second light guide structure of the first embodiment in the Z-direction.

Afterwards, for the second light guide structure 3, in this embodiment, the second planar light splitter element 312 is configured to reflect toward the light emitting surface 313 all of the first light beam 121 deflected by the light deflection sheet 40 such that all of the first light beam 121 reflected by the second planar light splitter element 312 is emitted from the light emitting surface 313 at the deflection angle pair (+α1, −α1) with respect to the X-direction, as shown in FIGS. 10 and 11. The second planar light reflection element 351 is configured to reflect toward the second planar light splitter element 312 the second light beam 122, which enters the third prism 35, in the X-direction such that the second light beam 122 reflected by the second planar light reflection element 351 travels in the X-direction, passes through the third and second prisms 35, 32, the second planar light splitter element 312 and the first prism 31, and is emitted from the light emitting surface 313, as shown in FIG. 11.

Since the refractive indices of the optical adhesives respectively used between the light collimator 112 and the light incident surface 213 and between the light entry end surface 131 of the light guide plate 13 and the light emitting surface 313 are exemplified as being lower than those of the first prisms 21, 31 of the first and second light guide structures 2, 3 in this embodiment, the first light beam 121 reflected by the first planar light splitter element 212 is ensured to sequentially pass through the first prism 21 and the light deflection sheet 40, and then impinge on the third side surface 314 of the first prism 31 so as to minimize the leakage of the first light beam 121 through the light incident surface 213 or the light emitting surface 313 during its travel in the Z-direction.

FIG. 12 is a simulated characteristic diagram showing an angular intensity distribution, in a Z-Y plane such as the light emitting surface 313, of light, such as each light point, emitted from the light regulation device 15. As can be seen from FIG. 12, the relative intensity of each light point in the light emitting surface 313 distributes around 0° (i.e., the deflection angle of 0° with respect to the X-direction) and around +22° and −22° [i.e., the deflection angle pair (+α1, −α1) with respect to the X-direction], has a maximum value of about 1 at about 0°, +22° and −22°, and is almost zero within an angle range of about +5~+17.5 and within another angle range of about −5°~−17.5°. The optical intensity of each light point around 0° is contributed by the second light beam 122, and the optical intensities of each light point around +22° and −22° are contributed by the first light beam 121.

Figure 13:
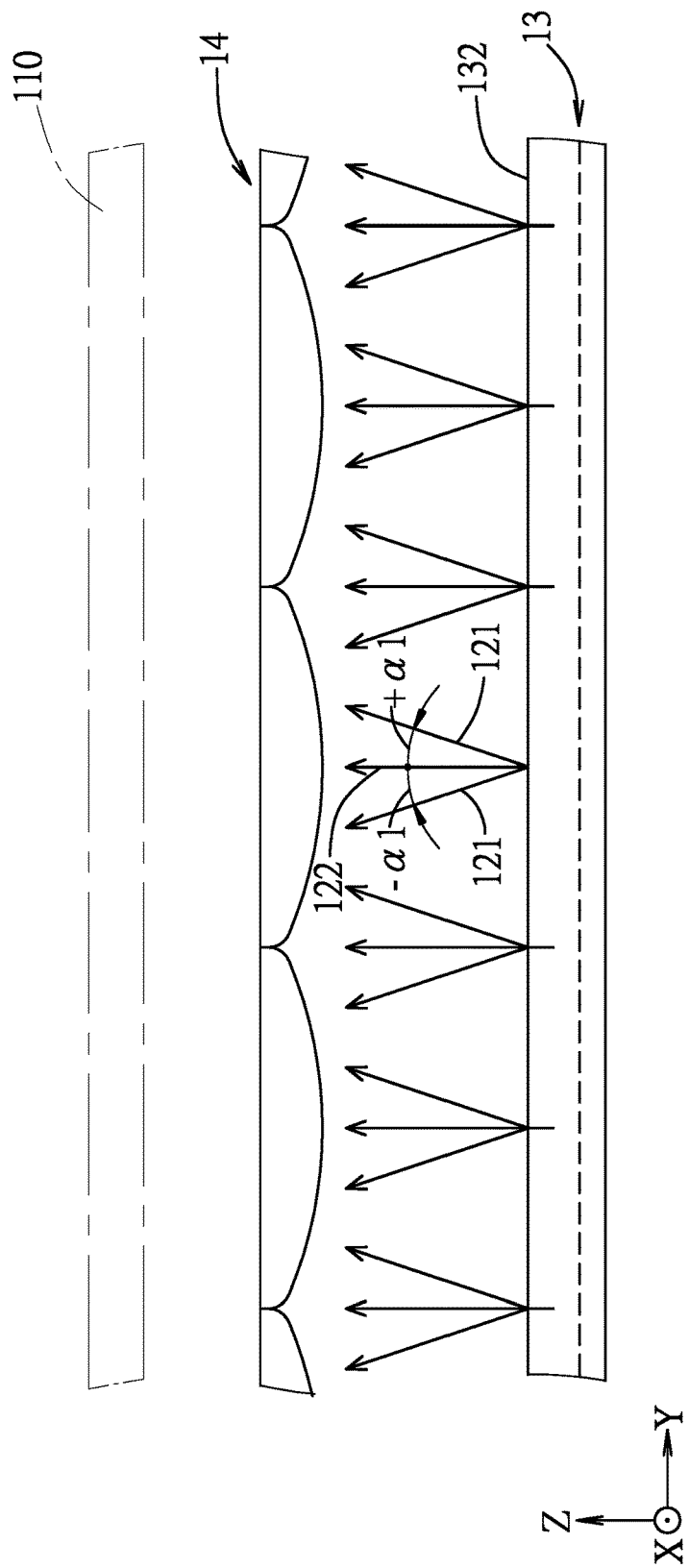
FIG. 13 is a diagram schematically showing light behavior with respect to a light guide plate of the first embodiment in the X-direction.

Thereafter, all of the incident light 12, which is regulated by the light regulation device 15 in deflection with respect to the X-direction and enters the light entry end surface 131 of the light guide plate 13, is guided by the light guide plate 13 in a known way so as to emit a surface light source (not shown) from the light exit side surface 132. It is noted that each light point in the surface light source, similar to that in the light emitting surface 313, has one light component contributed by the second light beam 122 and emitted in the Z-direction, and the other components contributed by the first light beam 121 and emitted at +α1 and −α1 with respect to the Z-direction, as shown in FIG. 13.

Figure 14:
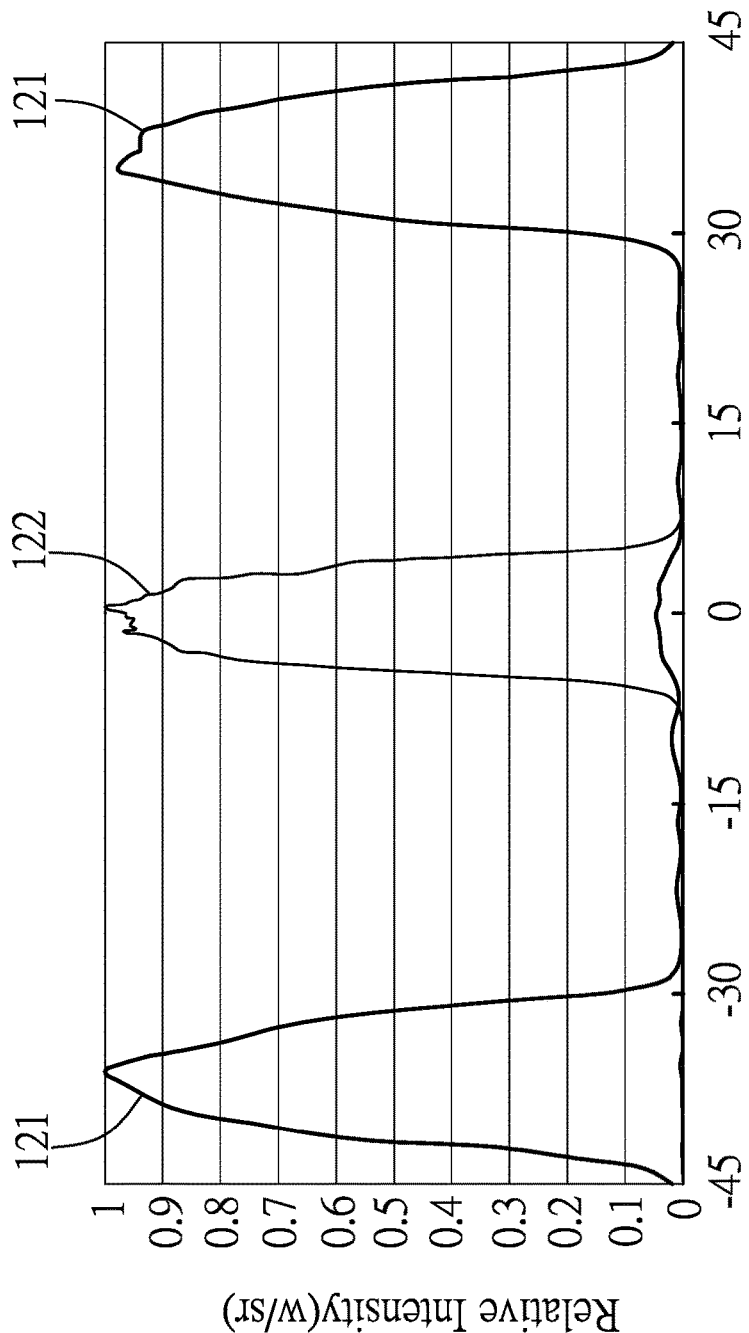
FIG. 14 is a simulated characteristic diagram showing an angular intensity distribution, in a Y-X plane, of light emitted from the light guide plate of the first embodiment.

FIG. 14 is a simulated characteristic diagram showing an angular intensity distribution, in a Y-X plane, of light, such as each light point, emitted from the light exit side surface 132 of the light guide plate 13. The angular intensity distribution has similar features as those of FIG. 12.

Finally, the surface light source is provided to the LCD panel 110 after passing through the optical lens 14.

Referring to FIGS. 15 to 24, the second embodiment of the backlight module 100' of this disclosure is shown to be a modification of the first embodiment. This embodiment differs from the first embodiment in the light regulation device 15.

In this embodiment, the first light guide structure 2 further includes a fourth prism 26 and a fifth prism 27 disposed between the second prism 22 and the third prism 25, a third planar light splitter element 232 disposed between the first planar light splitter element 212 and the first planar light reflection element 251 in the X-direction.

The fourth and fifth prism 26, 27 are identical to the first, second and third prisms 21, 22, 25 in size, shape and material. Each of the fourth and fifth prisms 26, 27 has a first side surface 263, 273, a second side surface 264, 274, and a third side surface 265, 275. The fourth and fifth prisms 26, 27 are stacked on each other in the Z-direction in a manner that the third side surfaces 265, 275 thereof face each other. The first side surface 263 of the fourth prism 26 is adhered to the second side surface 224 of the second prism 22 by an optical adhesive (indicated by the thick black line in FIG. 16) which has a refractive index close to or lower than that of the fourth prism 26. The second side surface 274 of the fifth prism 27 is adhered to the first side surface 253 of the third prism 25 by an optical adhesive (indicated by the thick black line in FIG. 16) which has a refractive index close to or lower than that of the third prism 25.

The third planar light splitter element 232 is positioned parallel to the first planar light splitter element 212, and is different from the first planar light splitter element 212 in splitting functions. In this embodiment, the third planar light splitter element 232 is a dichroic splitting film coated over the third side surface 265 of the fourth prism 26, and may be used to reflect, for example, but not limited to, red light. However, in other embodiments, the first planar light splitter element 212 can be used to reflect green light. The third planar light splitter element 232 is adhered to the third side surface 265 of the fourth prism 26 by an optical adhesive (indicated by the thick black line in FIG. 16) having the same refractive index as that of the fourth and fifth prisms 26, 27.

In this embodiment, the second light guide structure 3 further includes a fourth prism 36 and a fifth prism 37 disposed between the second prism 32 and the third prism 35, and a fourth planar light splitter element 332 disposed between the second planar light splitter element 312 and the second planar light reflection element 351 in the X-direction.

The fourth and fifth prism 36, 37 are identical to the first, second and third prisms 31, 32, 35 in size, shape and material. Each of the fourth and fifth prisms 36, 37 has a first side surface 363, 373, a second side surface 364, 374, and a third side surface 365, 375. The fourth and fifth prisms 26, 27 are stacked on each other in the Z-direction in a manner that the third side surfaces 265, 275 thereof face each other. The first side surface 363 of the fourth prism 36 is adhered to the second side surface 324 of the second prism 32 by an optical adhesive (indicated by the thick black line in FIG. 16) which has a refractive index close to or lower than that of the fourth prism 36. The second side surface 374 of the fifth prism 37 is adhered to the first side surface 353 of the third prism 35 by an optical adhesive (indicated by the thick black line in FIG. 16) which has a refractive index close to or lower than that of the third prism 35.

The fourth planar light splitter element 332 is positioned parallel to the second planar light splitter element 312, is symmetrical to the third planar deflection element 232 with respect to the light deflection sheet 40, and is similar to the third planar light splitter element 232) in splitting functions. In this embodiment, the fifth planar light splitter element 332 is also a dichroic splitting film coated over the third side surface 365 of the fourth prism 36 and may be used to reflect blue light. The fourth planar light splitter element 332 is adhered to the third side surface 375 of the fifth prism 37 by an optical adhesive (indicated by the thick black line in FIG. 16) having the same refractive index as that of the fourth and fifth prisms 36, 37.

Figure 19:
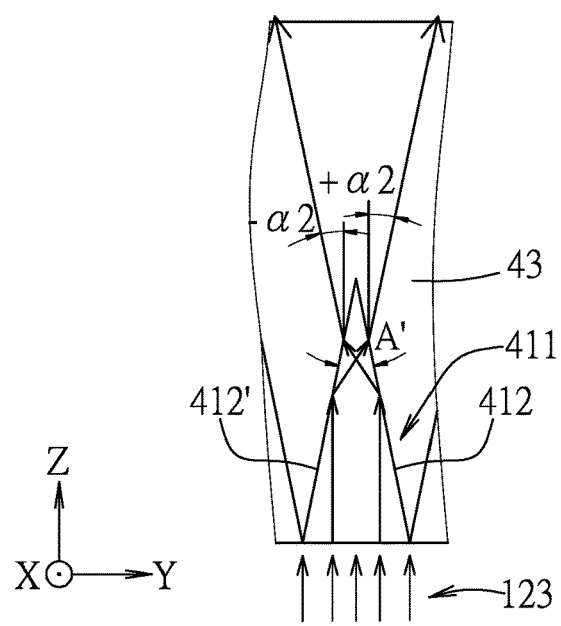
FIG. 19 is a diagram schematically showing light behavior, in the X-direction, with respect to each saw-toothed microstructure of the first light deflection layer corresponding to a second section of the light deflection sheet in position according to the second embodiment.

Further, the light deflection sheet 40 includes a first section 4 and a second section 4' connected to each other, wherein the first section 4 is attached between the second side surfaces 214, 314 of the first prisms 21, 31 of the first and second light guide structures 2, 3, and the second section 4' is attached between the second side surfaces 264, 364 of the fourth prisms 26, 36 of the first and second light guide structures 2, 3. It is noted that the first section 4 has the same configuration as that of the light deflection sheet 40 of the first embodiment (FIGS. 5 and 6). However, the second section 4' is substantially similar to the first section 4, but differs from the first section 4 in that the apex angle (A') of each saw-toothed microstructure 411 in the second section 4' of the light deflection sheet 40 is different from that of the apex angle (A) of each saw-toothed microstructure 411 in the first section 4 of the light deflection sheet 40. In this embodiment, the apex angle (A') is exemplified as 23, as shown in FIG. 19.

With reference to FIGS. 15 to 21, the light guiding operations of the light regulation device 15 of this embodiment will be described in detail below.

As described in the first embodiment, the first planar light splitter element 212 splits the incident light 12 into the first light beam 121 (i.e., the light beam of blue light) and the second light beam 122, wherein the first light beam 121 is reflected by the first planar light splitter element 212 in the Z-direction toward the first section 4 of the light deflection sheet 40, and the second light beam 122 is permitted to pass through the first planar light splitter element 212. The traveling path of the first light beam 121 is similar to that described in the first embodiment. That is, the first light beam 121 is deflected by the wave-like microstructures 421 of the second light deflection layer 42 before it is incident on the third side surfaces 413 of the saw-toothed microstructures 411 of the first light deflection layer 41 in the first section 4, and is refracted by the saw-toothed microstructures 411 of the first light deflection layer 41 from the first and second side surfaces 412, 412' of the saw-toothed structures 411 at the deflection angle pair (+α1, −α1) with respect to the Z-direction (see FIG. 18). Afterwards, the second planar light splitter element 312 reflects toward the light emitting surface 313 the first light beam 121 refracted from the first light deflection layer 41 such that the first light beam 121 is emitted from the light emitting surface 313 at the deflection angle pair (+α1, −α1) with respect to the X-direction (see FIG. 10). Similar to the first embodiment, the deflection angle pair (+α1, −α1) is (+22°, −22°).

The third planar light splitter element 232 is configured to split the second light beam 122 passing through the first planar light splitter element 212, and the second and fourth prisms 22, 26 in the X-direction into a third light beam 123 and a fourth light beam 124, to reflect the third light beam 123 in the Z-direction toward the second section 4' of the light deflection sheet 40, and to permit passage of the fourth light beam 124 in the X-direction therethrough. In this embodiment, the third light beam 123 is a light beam of red light. The first and third light beams 121, 123 may cooperatively serve as a portion of the incident light 12, and a fourth light beam 124 may be regarded as the other portion of the incident light 12.

Similar to the light behavior of the first light beam 121, the third light beam 123 entering the second section 4' of the light deflection sheet 40 is deflected by the wave-like microstructures 421 of the second light deflection layer 42 in the second section 4' before it is incident on the third side surfaces 413 of the saw-toothed microstructures 411 of the first light deflection layer 41 in the second section 4'. After the third light beam 123 passes through the wave-like microstructures 421, the angle distribution range of the third light beam 123 with respect to the Z-direction becomes wider due to refraction. In the case of the refractive index of the first optical adhesive layer 43 being e.g., 1.35 and the apex angle (A') of each saw-toothed microstructure 411 being e.g., 23°, the refractive index of the first light deflection layer 41 can be appropriately decided so that total internal reflection of one or more light rays of the first light beam 121 occurs at one of the first and second side surfaces 412, 412' of each saw-toothed microstructure 411 in the second section 4', and so that the light ray(s) of the third light beam 123 totally reflected is then refracted from the other one of the first and second side surfaces 412, 412' of the saw-toothed microstructure 411 in the second section 4' at a deflection angle pair (+α2, −α2) with respect to the Z-direction (see FIG. 19).

From the above, the deflection angle pair (+α2, −α2) is associated with the refractive indices of the first light deflection layer 41 (FIG. 6) and the first adhesive layer 43 (FIG. 6), and the apex angle (A') of each saw-toothed microstructure 411 in the second section 4' of the light deflection sheet 40. Thus, the third light beam 123 is refracted toward the fourth prism 36 from the first and second side surfaces 412, 412' of the saw-toothed structures 411 in the second section 4' at the deflection angle pair (+α2, −α2) with respect to the Z-direction. In this embodiment, the deflection angle pair (+α2, −α2) is, for example, (+12°, −12°).

Figure 20:
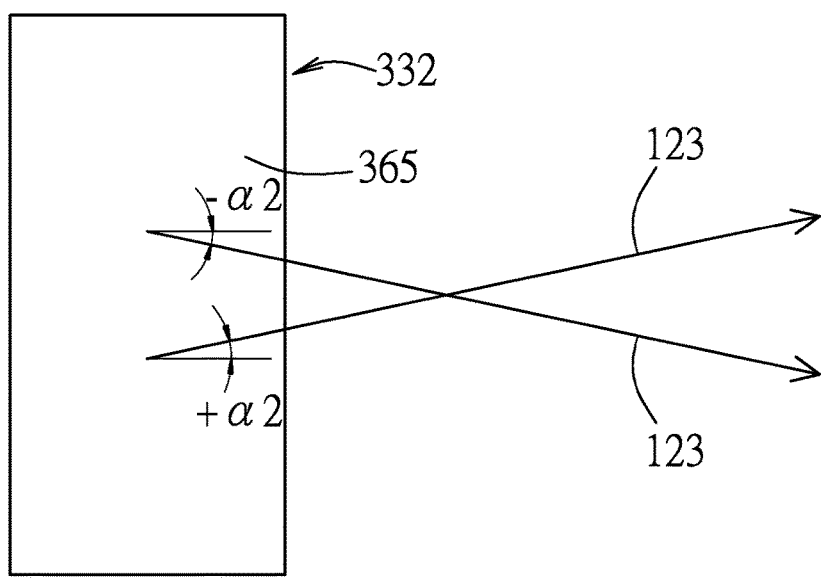
FIG. 20 is diagram schematically showing light behavior with respect to a fourth planar light splitter element of the second embodiment in the Z-direction.
Figure 21:
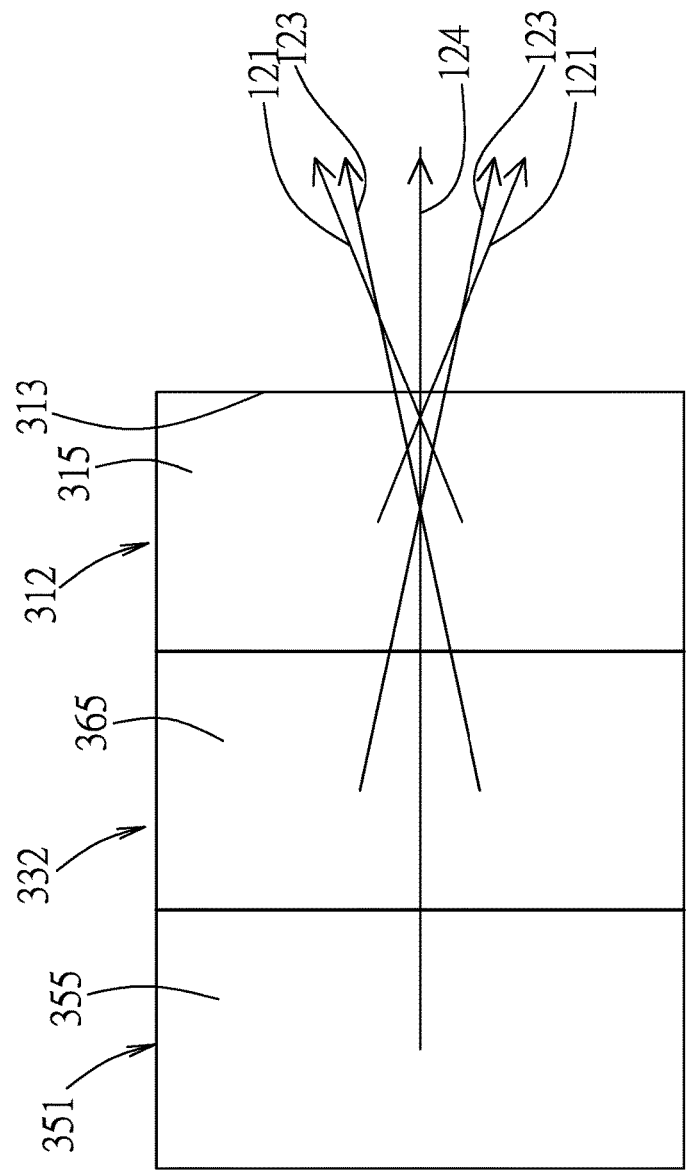
FIG. 21 is a diagram schematically showing light behavior in the second light guide structure of the second embodiment in the Z-direction.

Afterwards, the third planar light splitter element 232 is configured to reflect toward the light emitting surface 313 all of the third light beam 123 deflected by the second section 4' of the light deflection sheet 40 such that the third light beam 123 is emitted from the light emitting surface 313 at the deflection angle pair (+α2, −α2) with respect to the X-direction, as shown in FIGS. 20 and 21.

On the other hand, similar to the other portion of the incident light 12 of the first embodiment, the fourth light beam 124 passes through the third planar light splitter element 232, the fifth prism 27 and the third prism 25, and impinges on the third side surface 255, is then reflected by the first planar light reflection element 251 toward the third prism 35. When the fourth light beam 124 impinges on the third side surface 355, the second planar light reflection element 351 reflect the fourth light beam 124 toward the fourth planar light splitter element 337 to travel in the X-direction. Thus, the fourth light beam 124 passes through the third and fifth prisms 35, 37, the fourth planar light splitter element 332, the fourth and second prism 36, 32, the second planar light splitter element 312 and the first prism 31 in turn, after which it emits from the light emitting surface 313, as shown in FIG. 21.

Since the refractive indices of the optical adhesives between the second side surface 224 of the second prism 22 and the first side surface 263 of the fourth prism 26, and between the second side surface 324 of the second prism 32 and the first side surface 363 of the fourth prism 36 are exemplified as being lower than those of the fourth prisms 26 and 36, respectively, the third light beam 123 reflected by the third planar light splitter element 232 is ensured to sequentially pass through the fourth prism 26, the second section 4' of the light deflection sheet 40 and the fourth prism 36 and then impinge on the third planar light splitter element 3327 so as to reduce the leakage of the third light beam 123 through the first side surfaces 263, 363 of the fourth prisms 26 and 36 during its travel in the Z-direction. Further, since the refractive indices of the optical adhesives between the second side surface 274 of the fifth prism 27 and the first side surface 253 of the third prism 25 and between the second side surface 374 of the fifth prism 37 and the first side surface 353 of the third prism 35 are lower than those of the third prisms 25 and 35, respectively, the fourth light beam 124 reflected by the first planar light reflection element 251 is ensured to sequentially pass through the third prisms 25 and 35 and then impinge on the second planar light reflection element 351 so as to reduce the leakage of the fourth light beam 124 through the first side surfaces 353 of the third prisms 25 and 35 during its travel in the Z-direction.

FIG. 22 is a simulated characteristic diagram showing an angular intensity distribution, in a Z-Y plane (e.g., the light emitting surface 313), of light, such as each light point, emitted from the light regulation device 15. As can be seen from FIG. 22, the relative intensity of each light point in the light emitting surface 313 distributes around 0° (i.e., the deflection angle of 0° with respect to the X-direction), around +22° and −22° and around +12° and −12, has a maximum value of about 1 at about 0°, +22° and −22° [i.e., the deflection angle pair (+α1, −α1) with respect to the X-direction] and +12° and −12° [i.e., the deflection angle pair (+α2, −α2) with respect to the X-direction], and is almost zero at about ±5° and ±17.5°. The optical intensity of each light point around 0° is contributed by the fourth light beam 124, the optical intensities of each light point around +22° and −22° are contributed by the first light beam 121, and the optical intensities of each light point around +12° and −12° are contributed by the third light beam 123.

Figure 23:
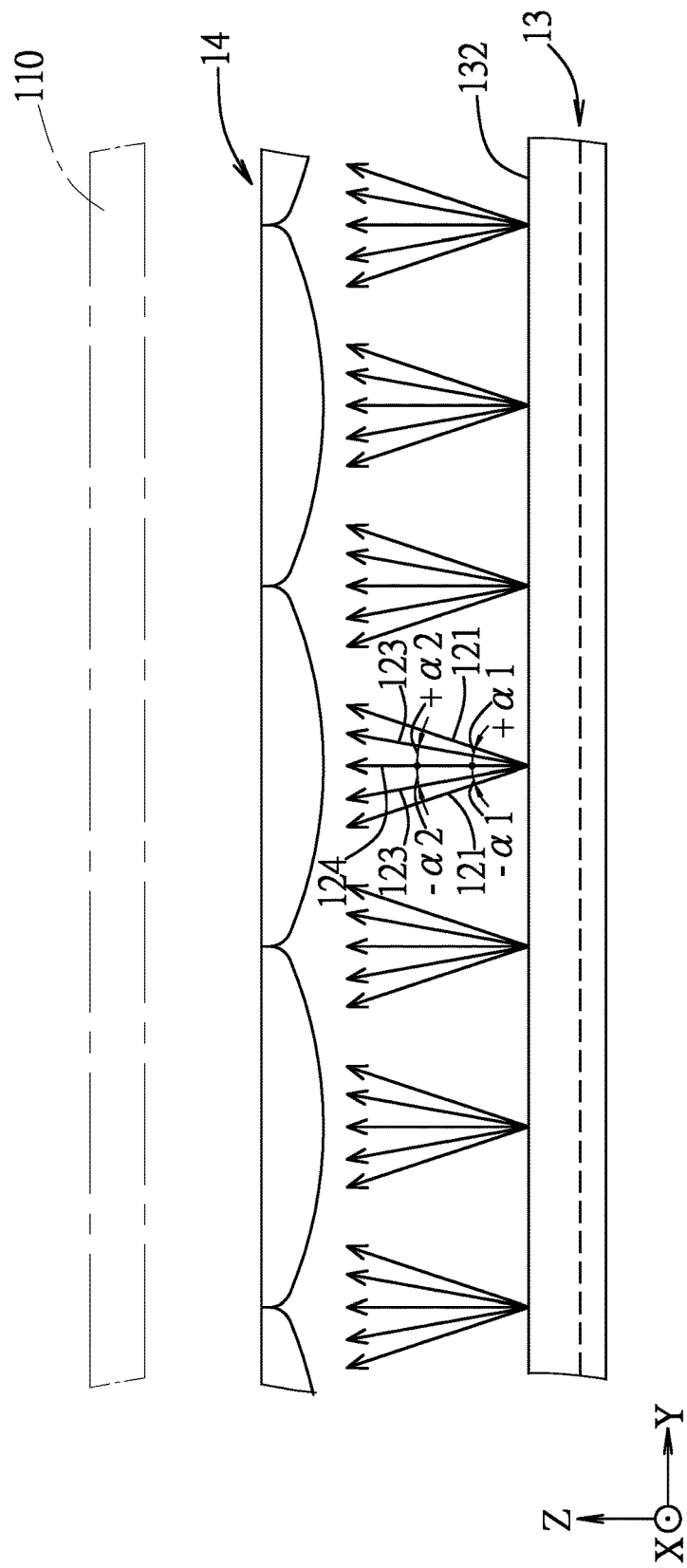
FIG. 23 is a diagram schematically showing light behavior with respect to the light guide plate of the second embodiment in the X-direction.

Thereafter, similar to the first embodiment, all of the incident light 12, which is regulated by the light regulation device 15 in deflection with respect to the X-direction and enters the light entry end surface 131 of the light guide plate 13, is guided by the light guide plate 13 so as to emit the surface light source from the light exit side surface 132. It is noted that each light point in the surface light source, similar to that in the light emitting surface 313, has one light component contributed by the fourth light beam 124 and emitted in the Z-direction, two light components contributed by the third light beam 123 and emitted at +α2 and −α2 with respect to the Z-direction, and the other components contributed by the first light beam 121 and emitted at +α1 and −α1 with respect to the Z-direction, as shown in FIG. 23.

FIG. 24 is a simulated characteristic diagram showing an angular intensity distribution, in a Y-X plane (e.g., the light exit side surface 132), of light, such as each light point, emitted from the light exit side surface 132 of the light guide plate 13. The angular intensity distribution has similar features as those of FIG. 22.

Figure 17:
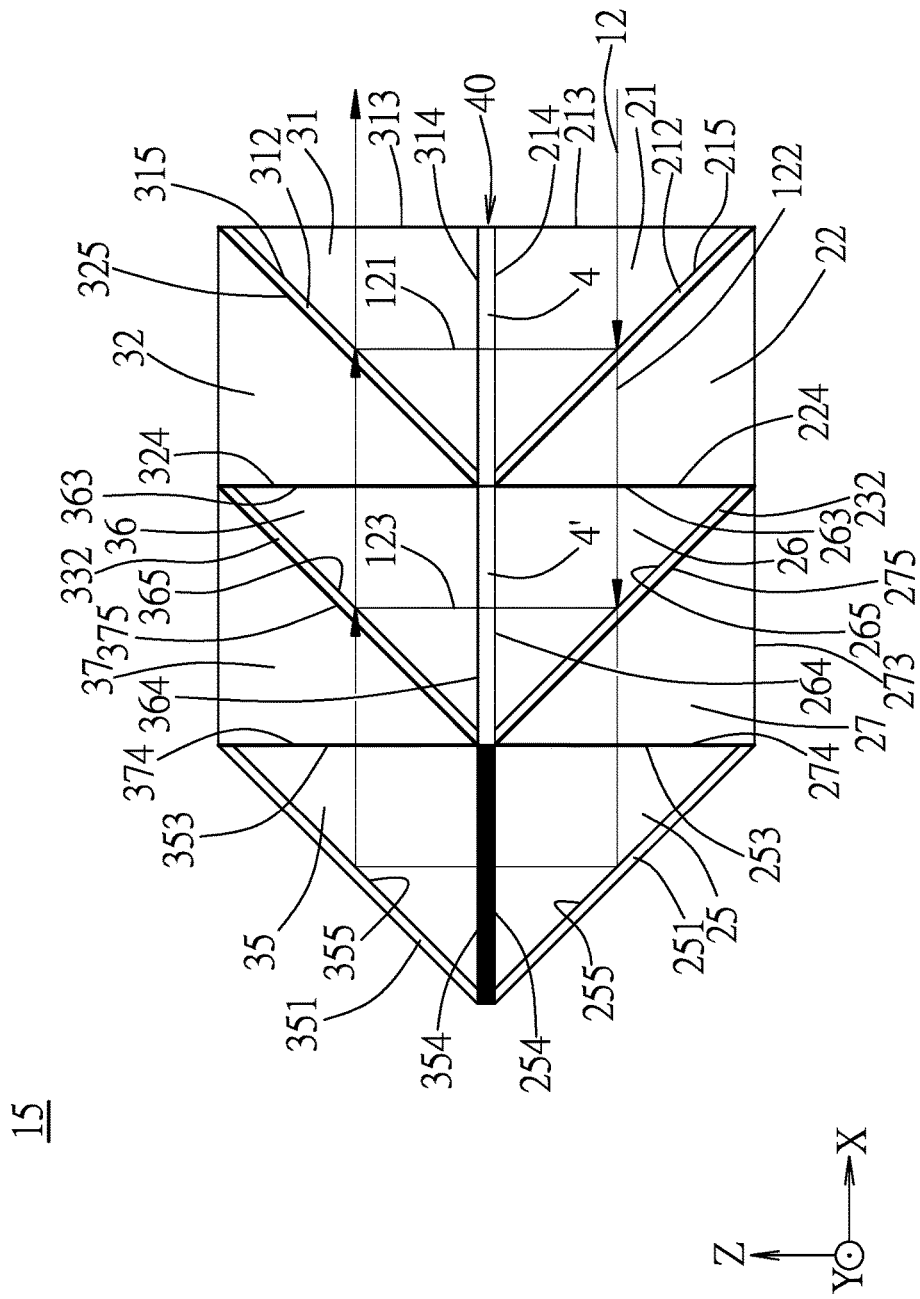
FIG. 17 is a diagram schematically showing light behavior, in the Y-direction, in the light regulation device of the second embodiment.
Figure 18:
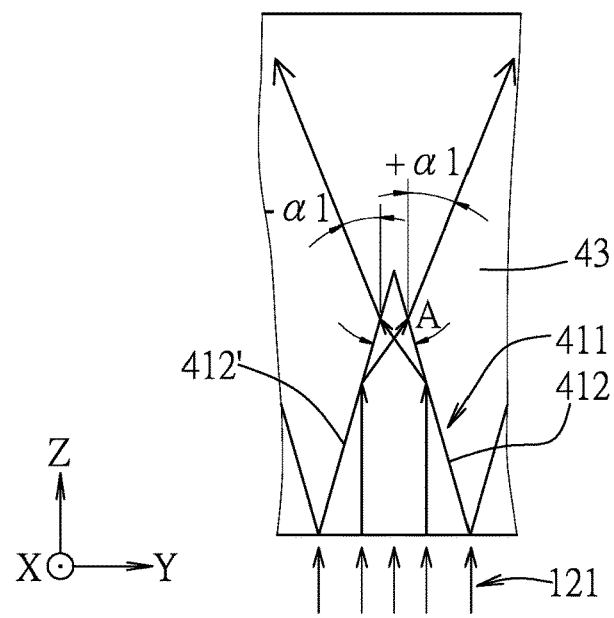
FIG. 18 is a diagram schematically showing light behavior, in the X-direction, with respect to each saw-toothed microstructure of the first light deflection layer corresponding to a first section of the light deflection sheet in position according to the second embodiment.
Figure 25:
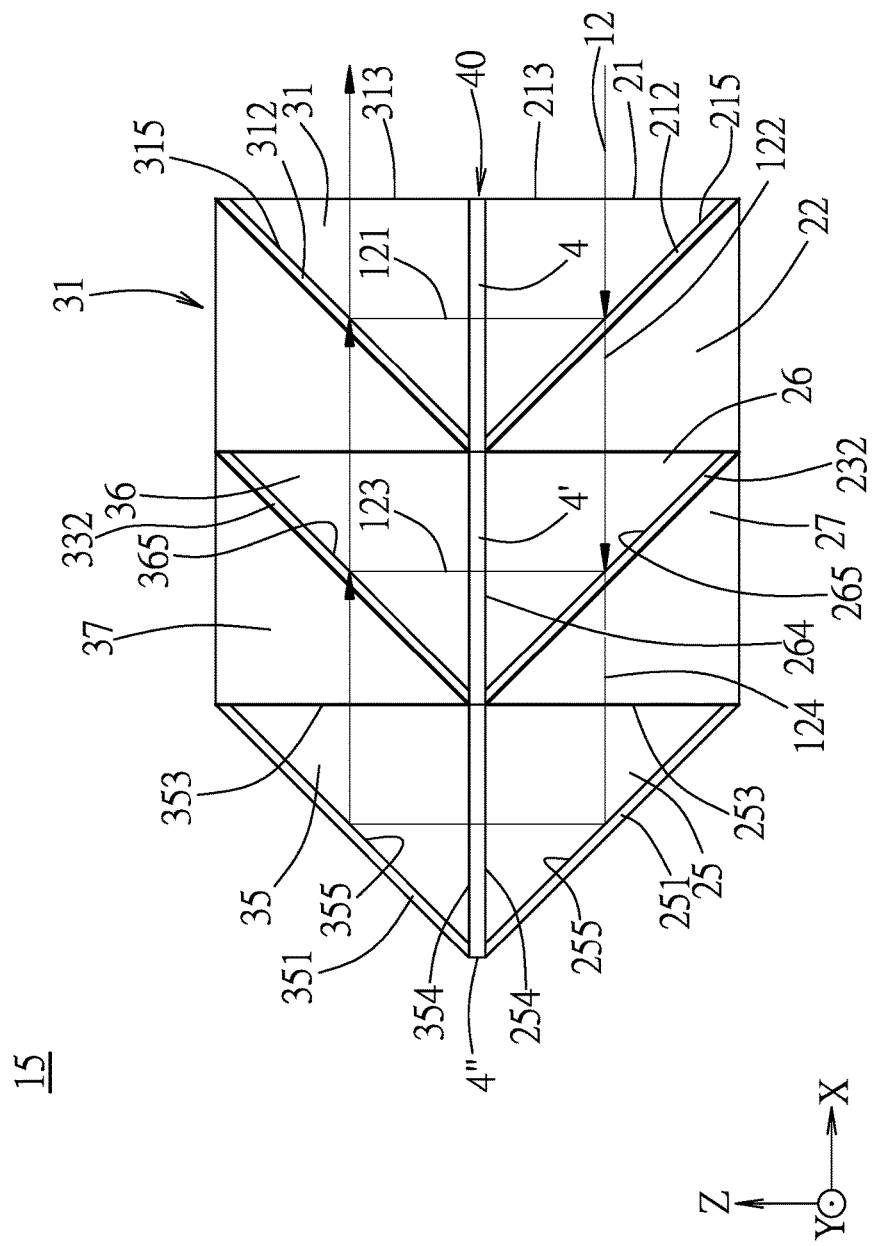
FIG. 25 is a diagram schematically showing light behavior, in the Y-direction, in a light regulation device of a backlight module according to the third embodiment of this disclosure.

Referring to FIG. 25, the light regulation device 15 of the backlight module according to the third embodiment of this disclosure is shown to be a modulation of the light regulation device 15 of the second embodiment (see FIG. 17). Unlike the second embodiment, the light deflection sheet 40 of the light regulation device 15 further includes a third section 4" connected to the second section 4' and attached between the second side surfaces 254, 354 of the third prisms 25, 35 of the first and second light guide structures 2, 3. In this embodiment, the second section 4" is substantially similar to the first and second sections 4, 4', but differs from those in that the apex angle (A") of each saw-toothed microstructure 411 in the third section 4" is different from that of the apex angle (A') of each saw-toothed microstructure 411 in the second section 4' (see FIG. 18), and is exemplified as 19°, as shown in FIG. 26.

Figure 26:
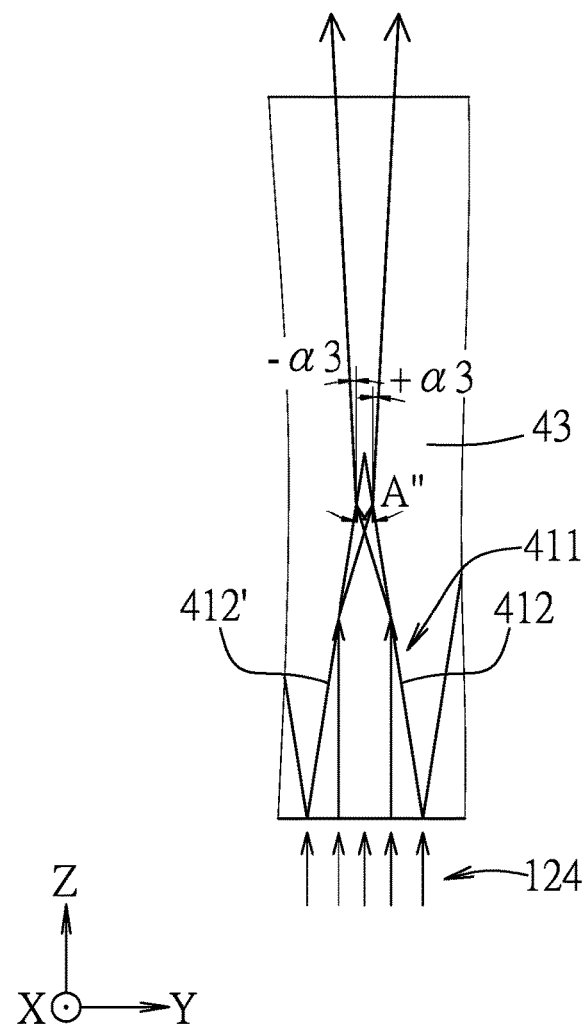
FIG. 26 is a diagram schematically showing light behavior, in the X-direction, with respect to each saw-toothed microstructure of the first light deflection layer corresponding to a third section of the light deflection sheet in position according to the third embodiment.

Referring to FIG. 26, due to the third section 4", one or more light rays of the fourth light beam 124 entering each saw-toothed microstructure 411 in the third section 4" occurs at one of the first and second side surfaces 412, 412' of the saw-toothed microstructure 411 in the third section 4", so that the light ray(s) of the fourth light beam 124 totally reflected is then refracted from the other one of first and second side surfaces 412, 412' of the saw-toothed microstructure 411 in the third section 4" at a deflection angle pair (+α3, −α3) with respect to the Z-direction.

From the above, the deflection angle pair (+α3, −α3) is associated with the refractive indices of the first light deflection layer 41 (FIG. 6) and the first adhesive layer 43 (FIG. 6), and the apex angle (A") of each saw-toothed microstructure 411 in the third section 4" of the light deflection sheet 40. Thus, the third light beam 123 is refracted toward the third prism 35 from the first and second side surfaces 412, 412' of the saw-toothed structures 411 in the third section 4" at the deflection angle pair (+α3, −α3) with respect to the Z-direction. In this embodiment, the deflection angle pair (+α3, −α3) is, for example, (+3, −3°).

Figure 27:
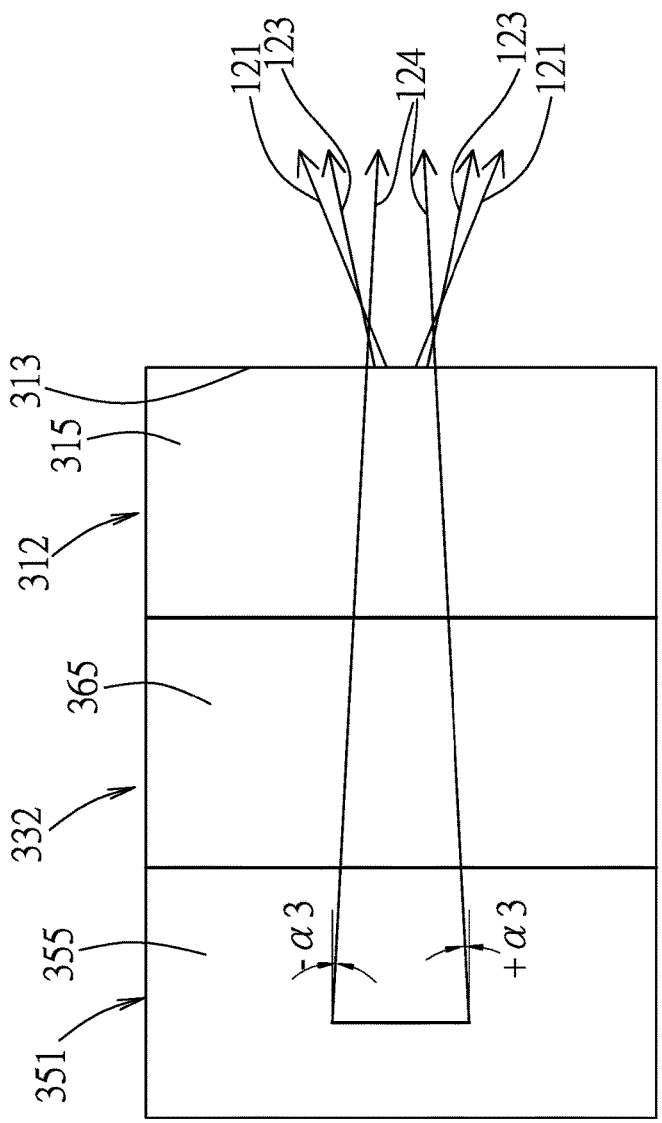
FIG. 27 is a diagram schematically showing light behavior in the second light guide structure of the third embodiment in the Z-direction.

Afterwards, the second planar light reflection element 351 reflects toward the light emitting surface 313 the fourth light beam 124 deflected by the third section 4" of the light deflection sheet 40 such that the fourth light beam 124 is emitted from the light emitting surface 313 at the deflection angle pair (+α3, −α3) with respect to the X-direction, as shown in FIG. 27.

It should be noted herein that, in other embodiments, the arrangement of the first, second and third sections 4, 4', 4" in the X-direction can be changed as required or one of the first and second sections 4, 4' of the light deflection sheet 40 can be omitted as required, so that the light regulation device 15 can thus modify angular color distribution of each light point in the surface light source provided by the backlight module.

Figure 28:
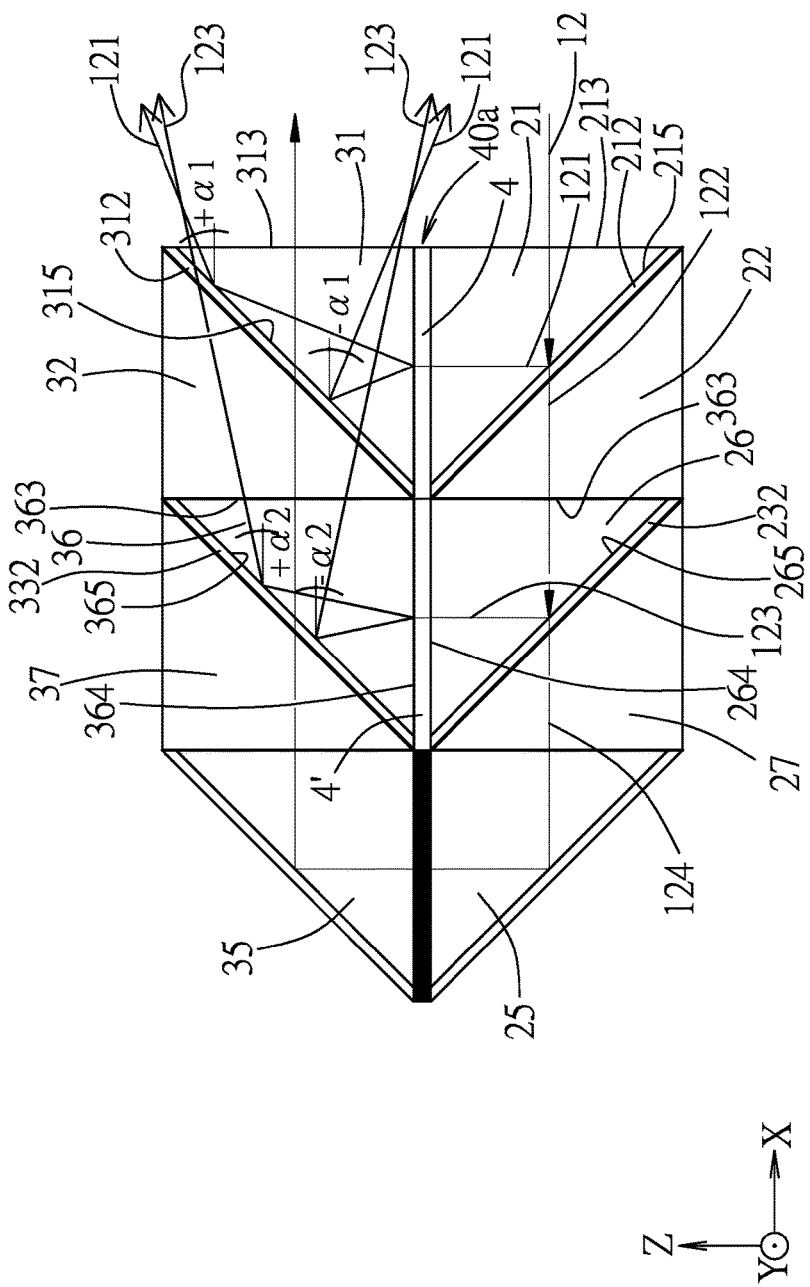
FIG. 28 is a diagram schematically showing light behavior, in the Y-direction, in a light regulation device of a backlight module according to the fourth embodiment of this disclosure.
Figure 29:
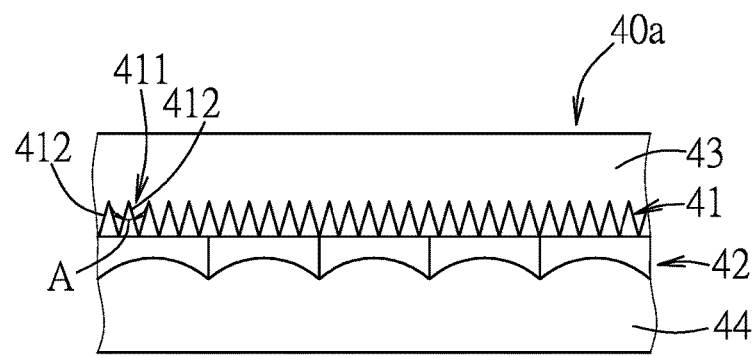
FIG. 29 is an enlarged fragmentary side view of the light deflection sheet of the fourth embodiment in the Y-direction.
Figure 29:
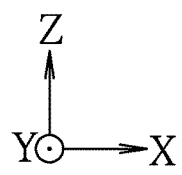
Figure 30:
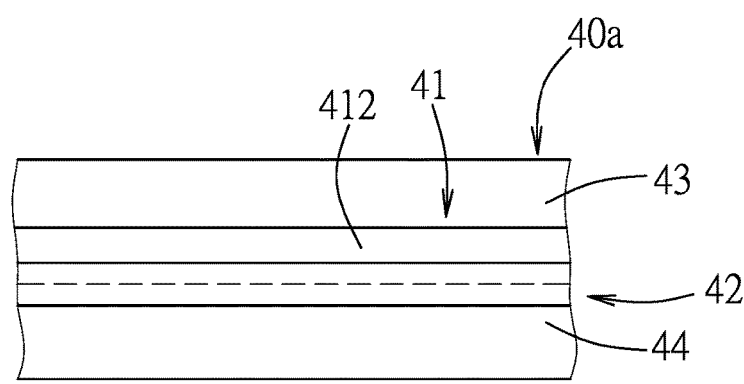
FIG. 30 is an enlarged fragmentary side view of the light deflection sheet of the fourth embodiment in the X-direction.
Figure 30:
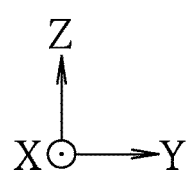

Referring to FIG. 28, the light regulation device 15 of the backlight module according to the fourth embodiment of this disclosure is a modification of the light regulation device 15 of the second embodiment. Unlike the second embodiment, the saw-toothed microstructures 411 of the first light deflection layer 41 of the light deflection sheet (40a) of the light regulation device 15 are arranged in the X-direction (see FIG. 29), and each saw-toothed microstructure 411 extends in the Y-direction (see FIG. 30). Despite this, the first light beam 121 is still emitted from the light emitting surface 313 at the deflection angle pair (+α1, −α1) with respect to the X-direction, and the third light beam 123 is still emitted from the light emitting surface 313 at the deflection angle pair (+α2, −α2) with respect to the X-direction, as shown in FIG. 28.

Figure 15:
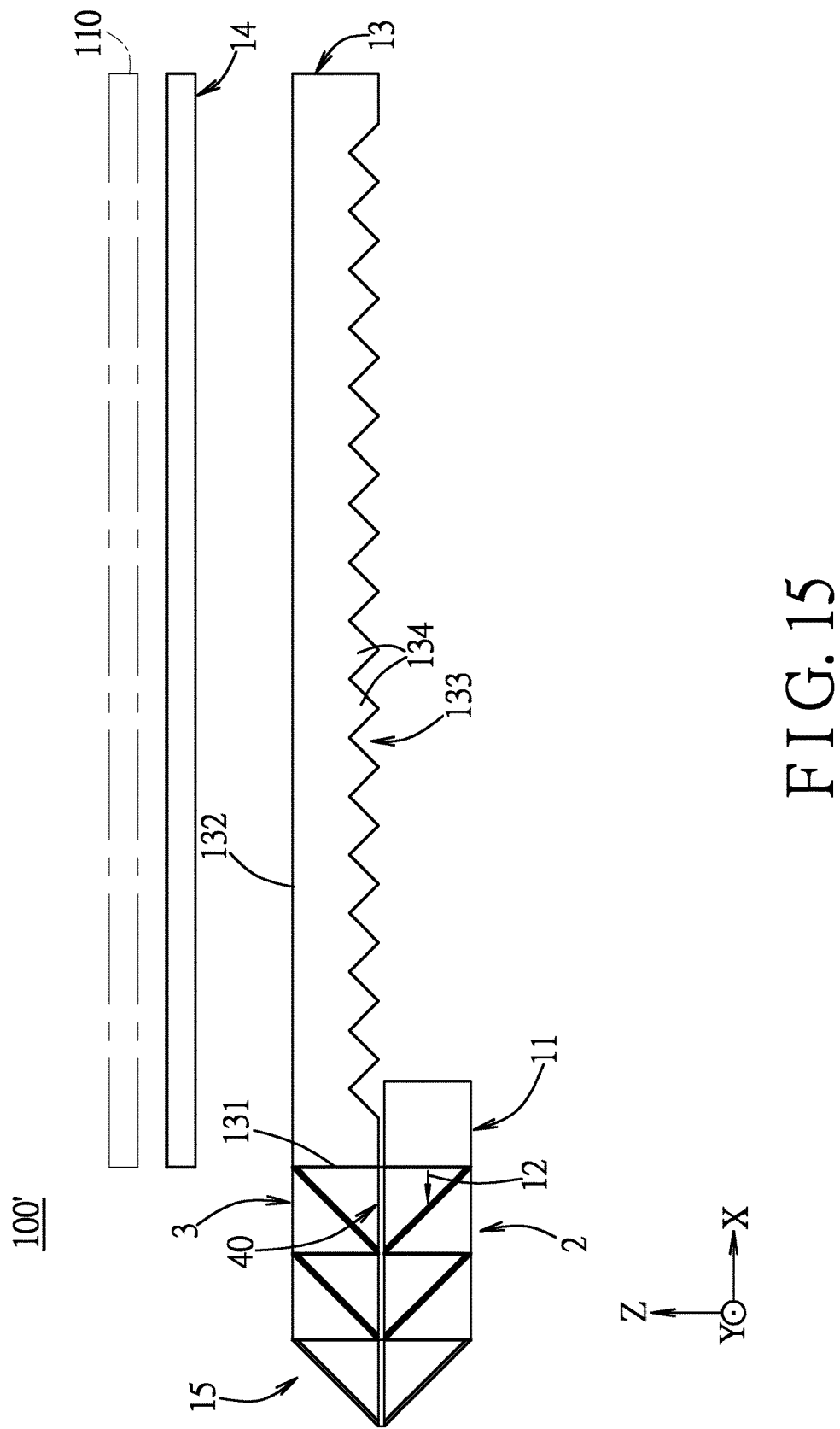
FIG. 15 is a schematic side view, in the Y-direction, of a backlight module according to the second embodiment of this disclosure.
Figure 16:
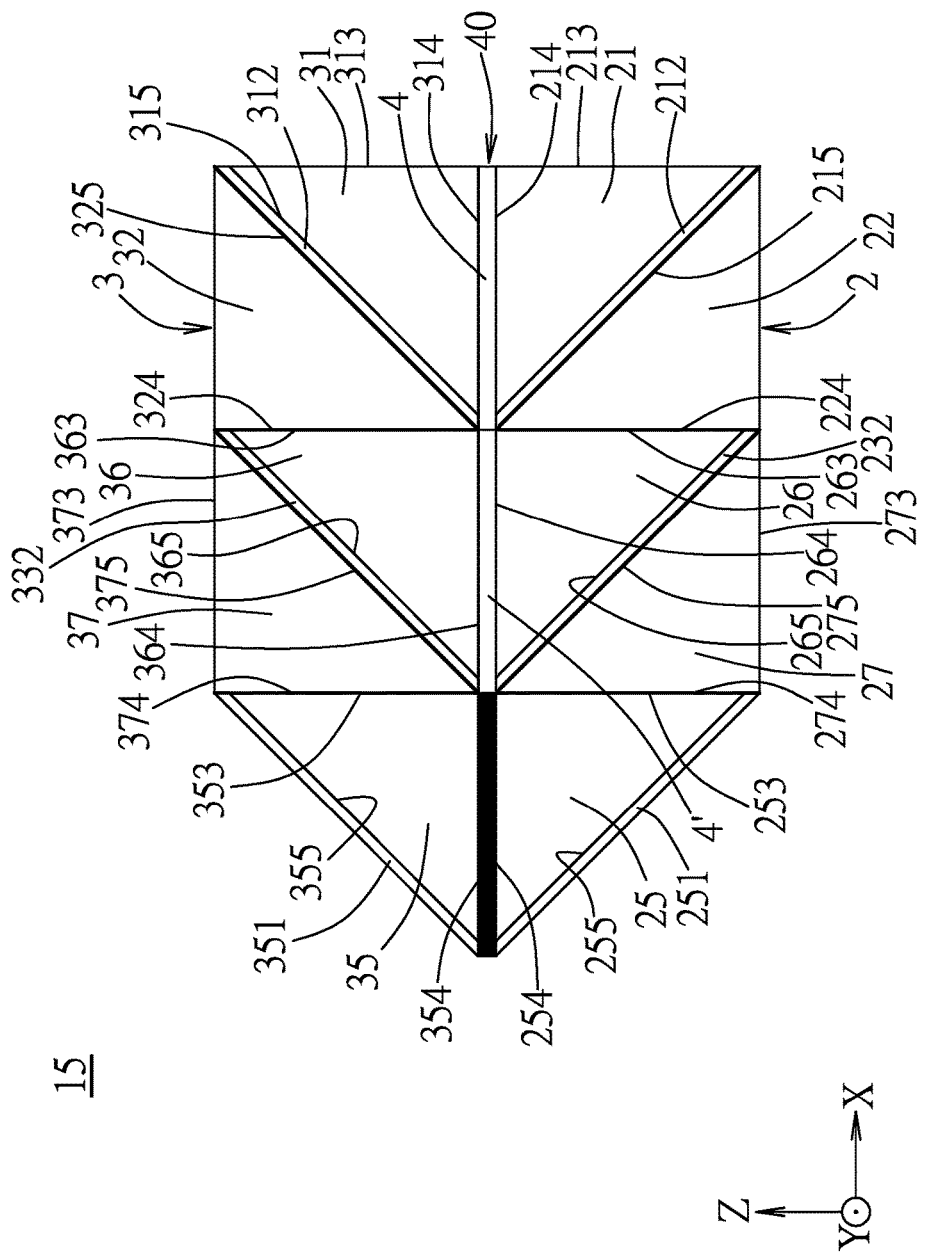
FIG. 16 is a schematic side view, in the Y-direction, of a light regulation device of the second embodiment.
Figure 31:
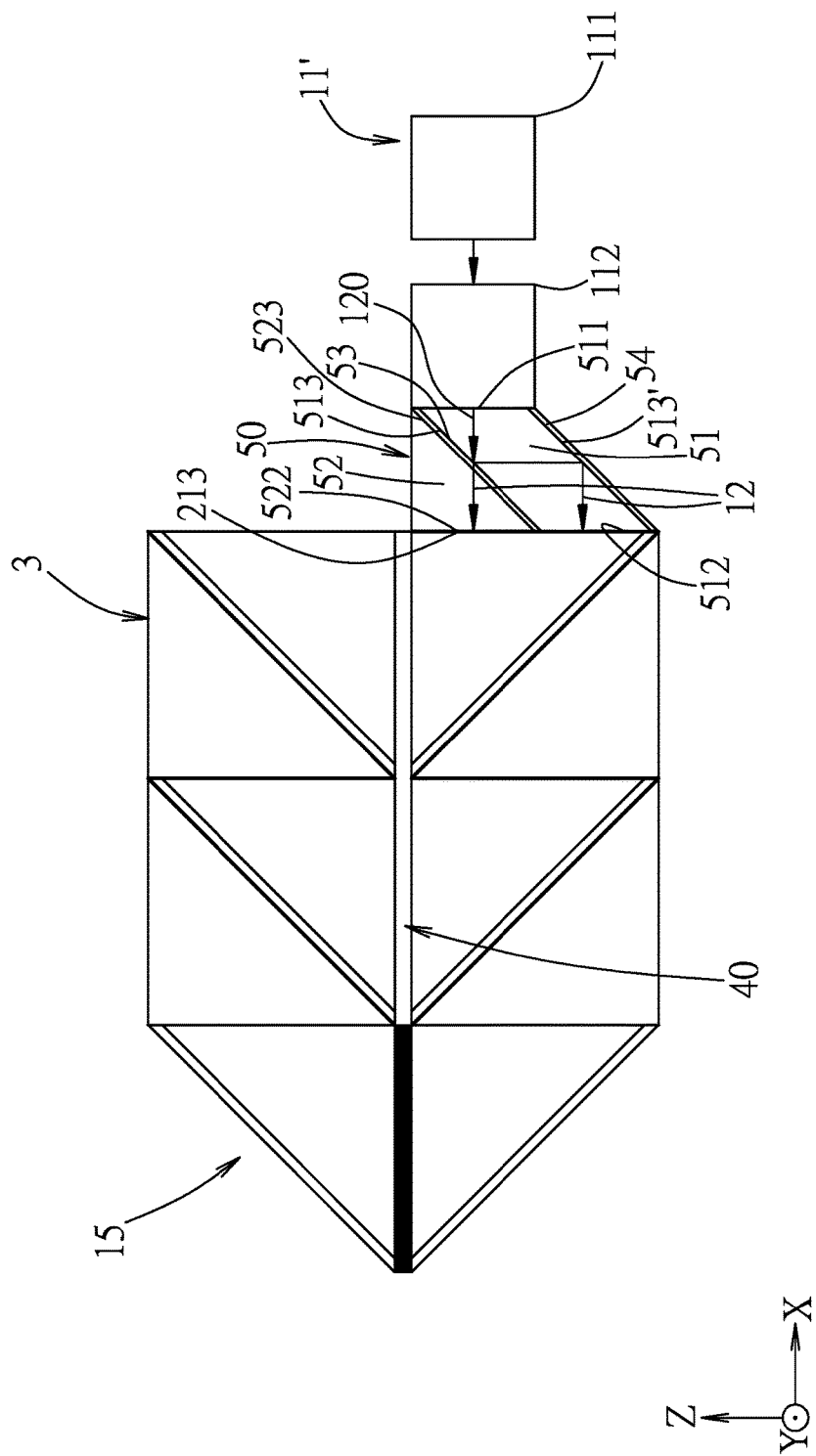
FIG. 31 is a schematic side view, in the Y-direction, of a backlight module according to the fifth embodiment of this disclosure without a light guide plate and an optical lens.

Referring to FIG. 31, the fifth embodiment of the backlight module of this disclosure (without the light guide plate and the optical lens) is shown to be a modification of the backlight module 100' of the second embodiment (see FIG. 15). Unlike the second embodiment, the light supply unit 11' includes the light beam generator (i.e., the light source 111 and the light collimator 112), and a light intensity regulator 50. It is noted that, in this embodiment, the size of the light collimator 112 in the Z-direction may be half the size of the light incident surface 213 in the Z-direction.

The light intensity regulator 50 has an input side attached to the light collimator 112 of the light beam generator for receiving the input light beam 120 formed thereby, and an output side attached to the light incident surface 213 of the first light guide structure 2. The light intensity regulator 50 is configured to regulate the light intensity of the input light beam 120 so as to emit the incident light 12 from the output side. In this embodiment, the light intensity regulator 50 may include a first prism 51, a second prism 52, a light splitter element 53 and a light reflection element 54. The first prism 51 may be a parallellogram prism extending in the Y-direction, and has opposite first and second side surfaces 511, 512 perpendicular to the X-direction, and opposite third and fourth side surfaces 513, 513'. The first side surface 511 serves as the input side and is adhered to the light collimator 112. The second side surface 512 is adhered to a half portion of the light incident surface 213. The second prism 52 may be an isosceles right triangular prism, and has first and second side surfaces 521, 522 perpendicular to each other, and an inclined third side surface facing the third side surface 513 of the first prism 51. The second side surface 522 is adhered to the other (half) portion of the light incident surface 213, and cooperates with the second side surface 512 of the first prism 51 to serve as the output side. The light splitter element 53 may be a monochromatic splitting film adhered between the third side surfaces 513, 523 of the first and second prisms 51, 52. The light reflection element 54 is a light reflection film coated over the fourth side surface 513' of the second prism 52.

The input light beam 120 formed by the light collimator 112 enters the first prism 51 through the first side surface 511 in the X-direction. When the input light beam 120 impinges on the light splitter element 53, the light splitter element 53 reflects a portion of the input light beam 120 (e.g., a light beam having a specific color or wavelength) to travel in the Z-direction toward the light reflection element 54, and permit passage of the other portion of the input light beam 120 therethrough such that the other portion of the input light beam 120 is incident on the half portion of the light incident surface 213. The light reflection element 54 then reflects the portion of the input light beam 120 to travel in the X-direction such that the portion of the input light beam 120 is incident on the other portion of the light incident surface 213.

It should be noted herein that, although the light collimator 112 mismatches the light incident surface 213 of the first light guide structure 2 in size, due to the presence of the light intensity regulator 50, the light supply unit 11' can still provide the incident light 12 using the same light beam generator. In other words, even if the sizes of the light deflection device 15 increases to match an increased-size LCD panel, using light intensity regulation of the light intensity regulator 50, the light supply unit 11' can still produce the incident light 12 suitable for the increased light incident surface 213 based on the input light beam 120 generated by the same light beam generator.

Figure 32:
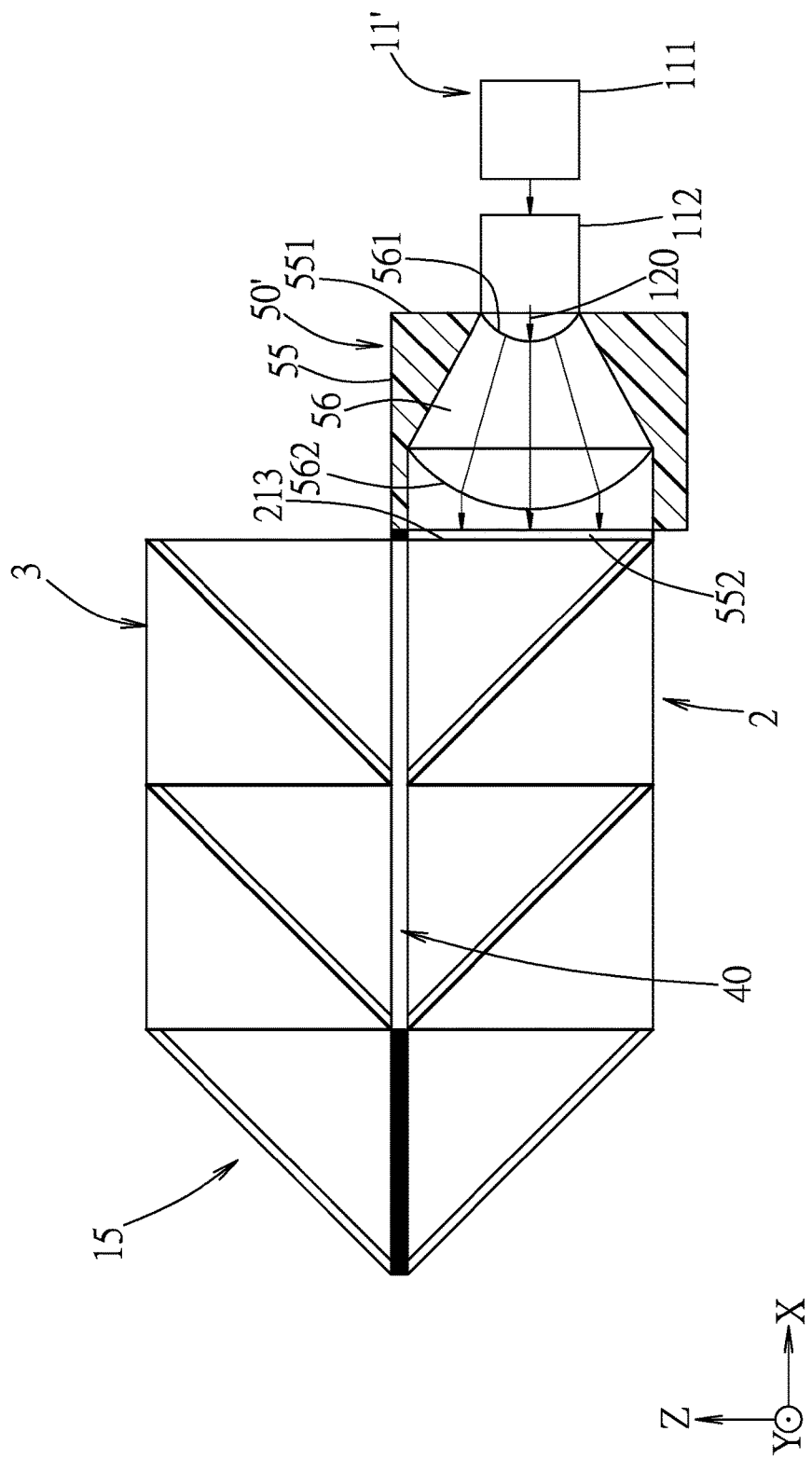
FIG. 32 is a partly sectional, schematic side view, in the Y-direction, of a backlight module according to the sixth embodiment of this disclosure without a light guide plate and an optical lens.

Referring to FIG. 32, the sixth embodiment of the backlight module of this disclosure (without the light guide plate and the optical lens) is shown to be a modification of the backlight module of the fifth embodiment (see FIG. 31). Unlike the fifth embodiment, the light intensity regulator 50' may include a housing 55, and a regulating lens 56 disposed in the housing 55. The housing 55 has a first open side 551 attached to the light collimator 112 and permitting the input light beam 120 formed thereby to enter the housing 55 therethrough, and a second open side 552 opposite to the first open side 551 in the X-direction and attached to the light incident surface 213. The regulating lens 56 has a concave surface 561 proximate to the first open side 551, and an enlarged convex surface 562 proximate to the second open side 552. The input light beam 120 entering the housing 55 is regulated by the regulating lens 56 produced by the light supply unit 11', so that the input light beam 120 travels in the regulating lens 56 in a divergent manner, and emits from the convex surface 562 in the X-direction as the incident light.

Figure 33:
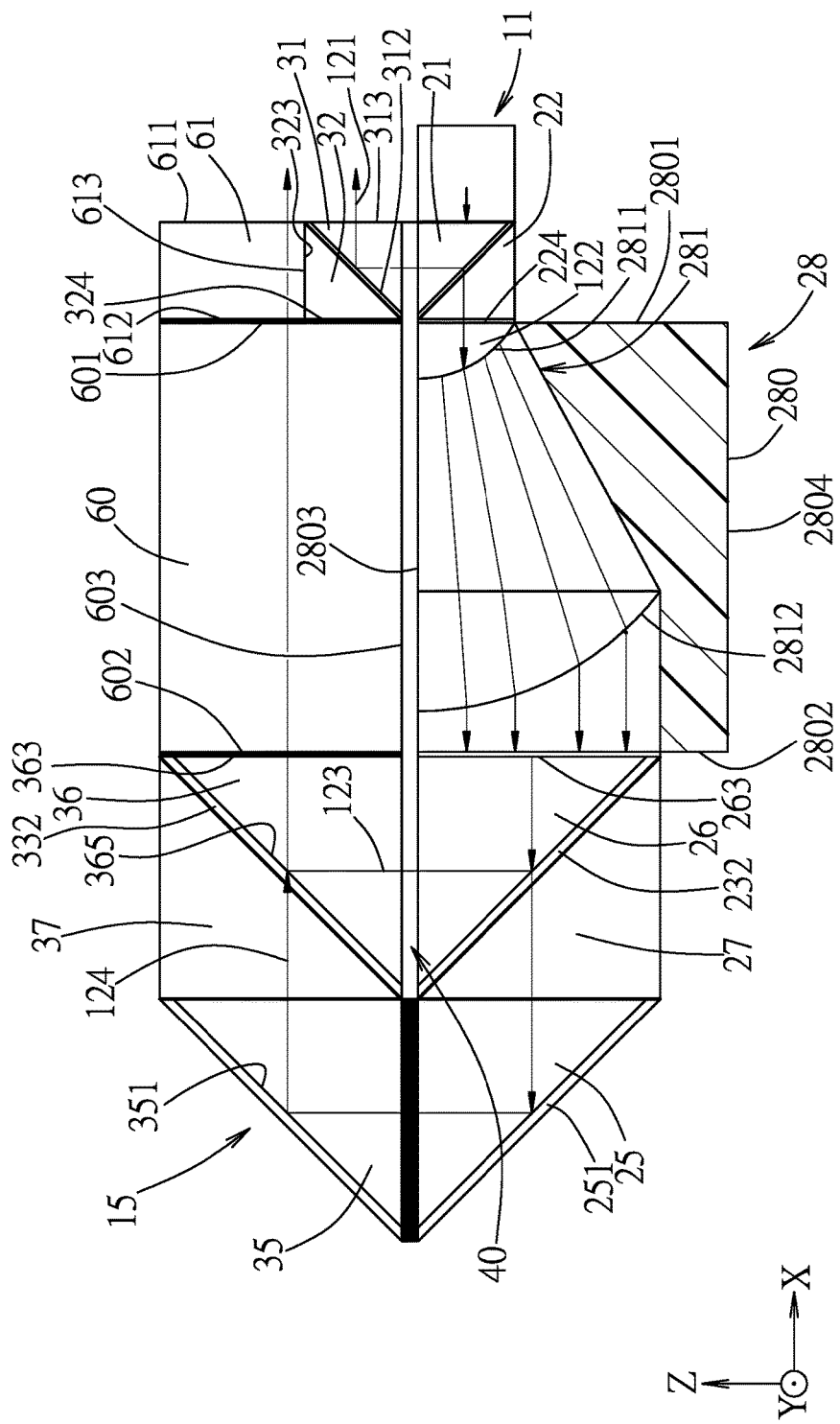
FIG. 33 is a partly sectional, schematic side view, in the Y-direction, of a backlight module according to the seventh embodiment of this disclosure without a light guide plate and an optical lens.

Referring to FIG. 33, the seventh embodiment of the backlight module of this disclosure (without the light guide plate and the optical lens) is shown to be a modification of the backlight module 100' of the second embodiment (FIG. 15). Unlike the second embodiment, the first and second prisms 21, 22, 31, 32 are identical to each other, and the third, fourth and fifth prisms 25, 26, 27, 35, 36, 37 are identical to each other. However, the sizes of the first and second prisms 21, 22, 31, 32 are smaller than those of the third, fourth and fifth prisms 25, 26, 27, 35, 36, 37. Due to such differences, the first light guide structure 2 of the light regulation device 15 further includes a light intensity regulator 28 disposed between the first and third planar light splitter elements 212, 232 and adhered between the second and fourth prisms 22, 26. The light intensity regulator 28 is configured to regulate the light intensity of the second light beam 122 toward the third planar light splitter element 232. In this embodiment, the light intensity regulator 28 has a housing 280, and a regulating lens 281 disposed in the housing 280. The housing 280 has a first open side 2801 adhered to the second side surface 224 of the first prism 22 and permitting the second light beam 122 to enter the housing 280 therethrough, a second open side 2802 opposite to the first open side 2801 in the X-direction and adhered to the first side surface 263 of the fourth prism 26, and third and fourth sides 2803, 2804 opposite to each other in the Z-direction. The regulating lens 281 has a concave surface 2811 proximate to the first open side 2801, and an enlarged convex surface 2812 proximate to the second open side 2802. The second light beam 122 entering the housing 280 is regulated by the regulating lens 281, so that the second light beam 122 travels in the regulating lens 281 in a divergent manner, and emits from the convex surface 2812 toward the third planar light splitter element 232 in the X-direction.

Furthermore, the second light guide structure 3 further includes a first light guide member 60 disposed between the fourth prism 36 and the second prism 32, and a second light guide member 61 disposed between the first light guide member 60 and the second prism 32. The second light guide member 61 has first and second side surfaces 611, 612 opposite to each other in the X-direction, and a third side surface 613 matchingly attached to the first side surface 323 of the second prism 32. In this embodiment, the first side surface 611 of the second light guide member 61 and the first side surface 313 of the first prism 31 cooperatively serves as the light emitting surface of the second light guide structure 3. The first light guide member 60 has a first side surface 601 matchingly adhered to the second side surface 324 of the second prism 32 and the second side surface 612 of the second light guide member 61, a second side surface 602 matchingly adhered to the first side surface 363 of the fourth prism 36, and a third side surface 603 matchingly adhered to the third side 2803 of the housing 280 and the regulating lens 281. The first light guide member 60 is configured to guide the third light beam 123 reflected by the fourth planar light splitter element 332, and the fourth light beam 124 passing through the fourth planar light splitter element 332 to pass therethrough in the X-direction. The second light guide member 61 is configured to guide a portion of the third light beam 123 and a portion of the fourth light beam 124 both passing though the first light guide member 60 to pass therethrough and emit out of the first side surface 611. Meanwhile, the other portion of the third light beam 123 and the other portion of the fourth light beam 124 both passing though the first light guide member 60 pass, in turn, through the second prism 32, the second planar light splitter element 312 and the first prism 31, and emit out of the first side surface 313.

It is noted that the refractive index of an optical adhesive (indicated by the thick black line) used to adhere the third side surface 603 of the first light guide member 60 to the third side surface of the housing 280 and the regulating lens 281 of the light intensity regulator 28 is lower than those of the regulating lens 281 and of the first light guide member 60. Through this, mutual interference between the second light beam 122 traveling in the regulating lens 281 and the third light beam 123 and the fourth light beam 124 traveling in the first light guide member 60 can be reduced.

Figure 34:
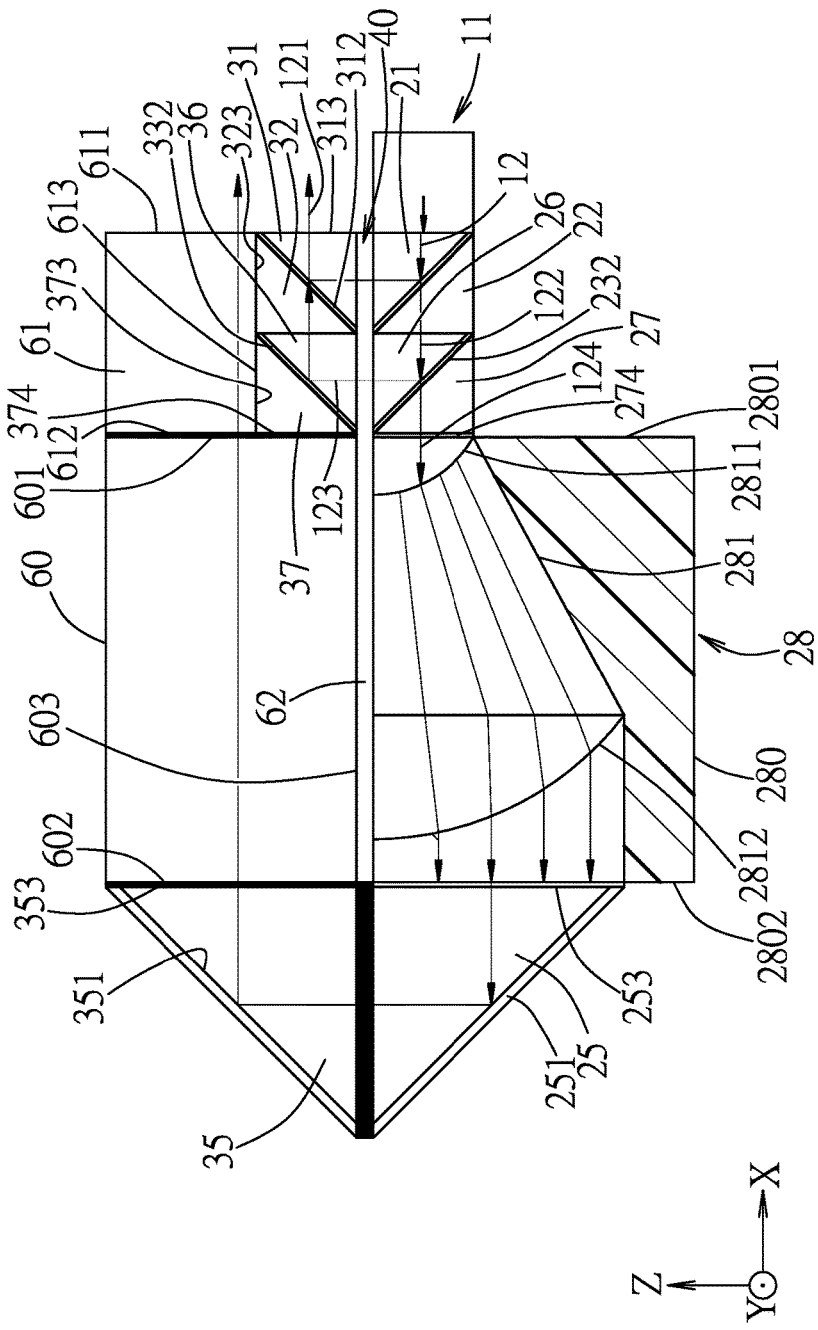
FIG. 34 is a partly sectional, schematic side view, in the Y-direction, of a backlight module according to the eighth embodiment of this disclosure without a light guide plate and an optical lens.
Figure 35:
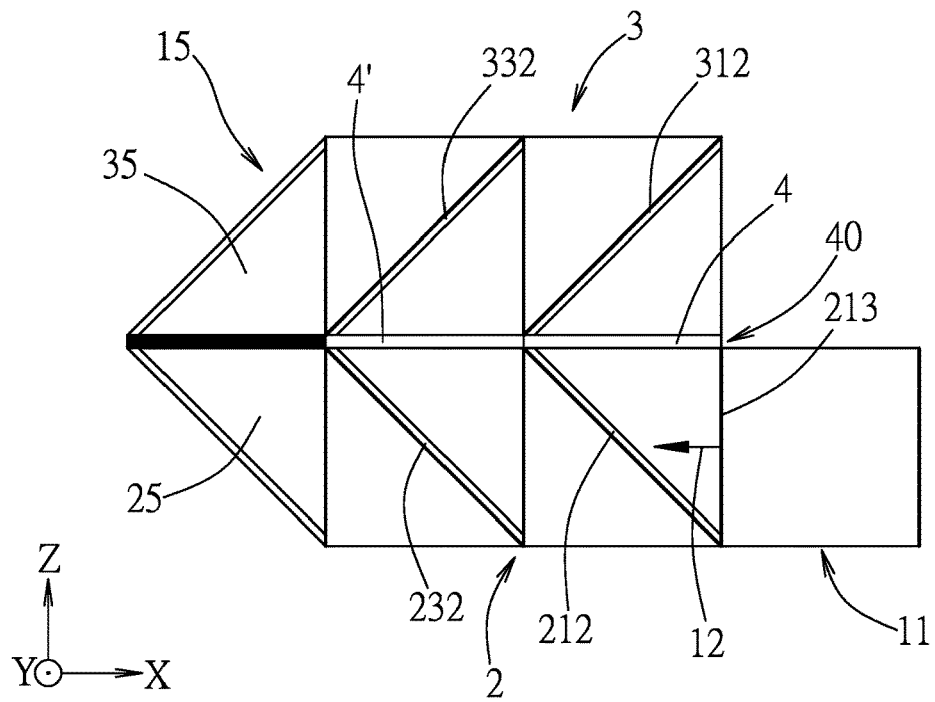
FIG. 35 is a schematic side view, in the Y-direction, of a backlight module according to the ninth embodiment of this disclosure without a light guide plate and an optical lens.
Figure 36:
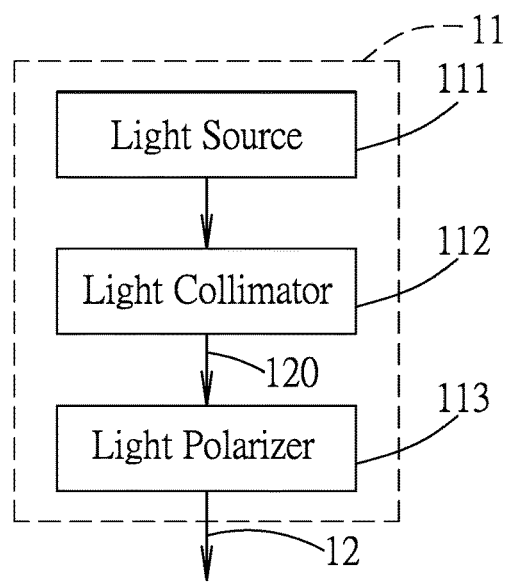
FIG. 36 is a schematic block diagram of a light supply unit of the ninth embodiment.

Referring to FIG. 34, the eighth embodiment of the backlight module of this disclosure (without the light guide plate and the optical lens) is shown to be a modification of the seventh embodiment. Unlike the seventh embodiment, the first, second, third and fourth prisms 21, 22, 26, 27, 31, 32, 36, 37 are identical to each other, and the third prisms 25, 35 are identical to each other. However, the sizes of the first, second, third and fourth prisms 21, 22, 26, 27, 31, 32, 36, 37 are smaller than those of the third prisms 25, 35. Due to such differences, the light intensity regulator 28 of this embodiment is disposed between the third planar light splitter element 232 and the first planar light reflection element 251. Specifically, the first open side 2801 of the housing 280 is adhered to the second side surface 274 of the fifth prism 27, and the second open side 2802 thereof is adhered to the first side surface 253 of the third prism 25. In this embodiment, the light intensity regulator 28 is configured to regulate the light intensity of the fourth light beam 124 toward the first planar light reflection element 251.

Furthermore, the third side surface 613 of the second light guide member 61 is matchingly adhered to the first side surfaces 323, 373 of the second and fifth prisms 32, 37. The first side surface 601 of the first light guide member 60 is matchingly adhered to the second side surfaces 374, 612 of the fifth prism 37 and the second light guide member 61, and the second side surface 602 thereof is matchingly adhered to the first side surface 353 of the third prism 35. In this embodiment, the first light guide member 60 is configured to guide the fourth light beam 124 reflected by the second planar light reflection element 351 to pass therethrough in the X-direction. The second light guide member 61 is configured to guide a portion of the fourth light beam 124 passing through the first light guide member 60 to pass therethrough and emit out of the first side surface 611. Meanwhile, the other portion of the fourth light beam 124 passing though the first light guide member 60 passes, in turn, through the fifth prism 37, the fourth planar light splitter element 332, the fourth and second prisms 36, 32, the second planar light splitter element 312 and the first prism 31, and emits out of the first side surface 313.

Referring to FIGS. 35 to 41, the ninth embodiment of the backlight module of this disclosure (without the light guide plate and the optical lens) is shown to be a modification of the backlight module 100' of the second embodiment (FIG. 15). Unlike the second embodiment, the light supply unit 11 further includes a polarizer 113 configured to convert the input light beam 120 formed by the light collimator 112 into a linearly polarized light beam. In this embodiment, the linearly polarized light beam serves as the incident light 12. Furthermore, in this embodiment, each of the first to fourth planar light splitter elements 212, 232, 312, 332 is a linear polarization splitting film.

Figure 37:
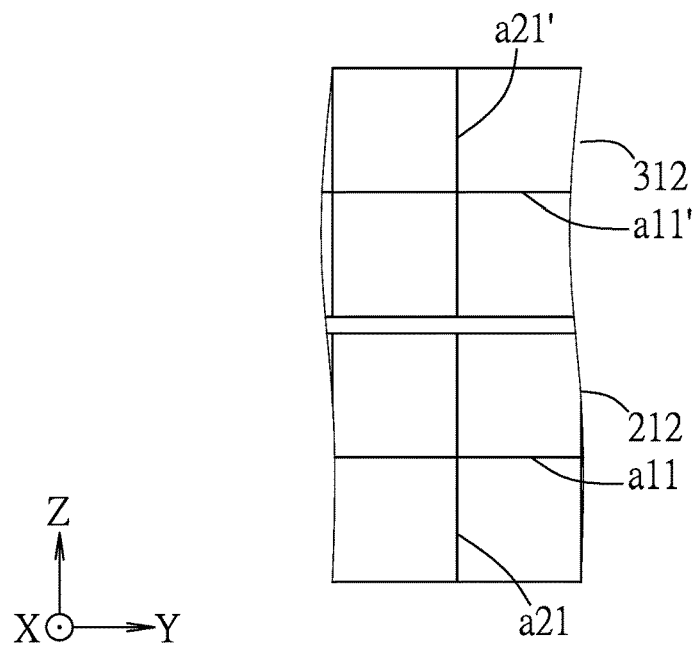
FIG. 37 is a fragmentary side view in the X-direction schematically showing a first reflection axis and a first transmission axis of a first planar light splitter element, and a second reflection axis and a second transmission axis of a second planar light splitter element of the ninth embodiment.
Figure 38:
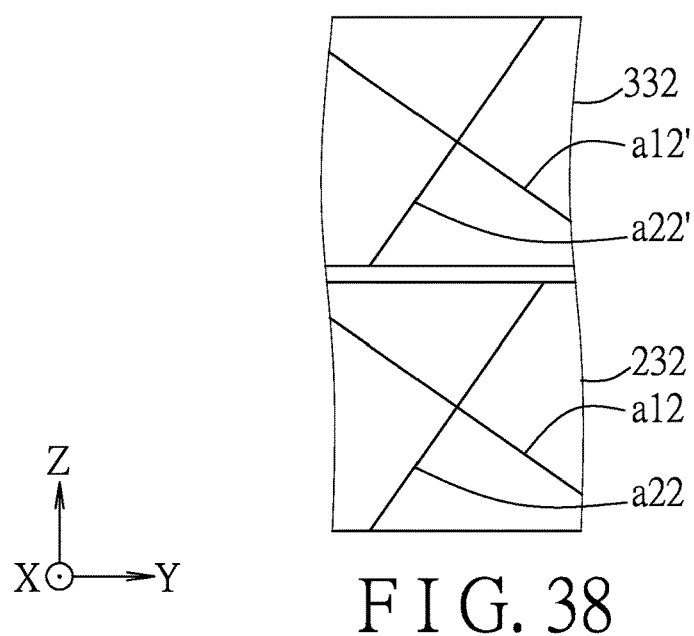
FIG. 38 is a fragmentary side view in the X-direction schematically illustrating a third reflection axis and a third transmission axis of a third planar light splitter element, and a fourth reflection axis and a fourth transmission axis of a fourth planar light splitter element of the ninth embodiment.

As shown in FIG. 37, the first planar light splitter element 212 has a first reflection axis (a11) parallel to the Y-direction, and a first transmission axis (a21) perpendicular to the first reflection axis (a11), and the second planar light splitter element 312 has a second reflection axis (a11') parallel to the Y-direction, and a second transmission axis (a21') perpendicular to the first reflection axis (a11'). As shown in FIG. 38, the third planar light splitter element 232 has a third reflection axis (a12) inclined to the Z- and Y-directions, and a third transmission axis (a22) perpendicular to the third reflection axis (a12), and the fourth planar light splitter element 332 has a fourth reflection axis (a12') inclined to the Z- and Y-directions, and a fourth transmission axis (a22') perpendicular to the fourth reflection axis (a12').

Figure 39:
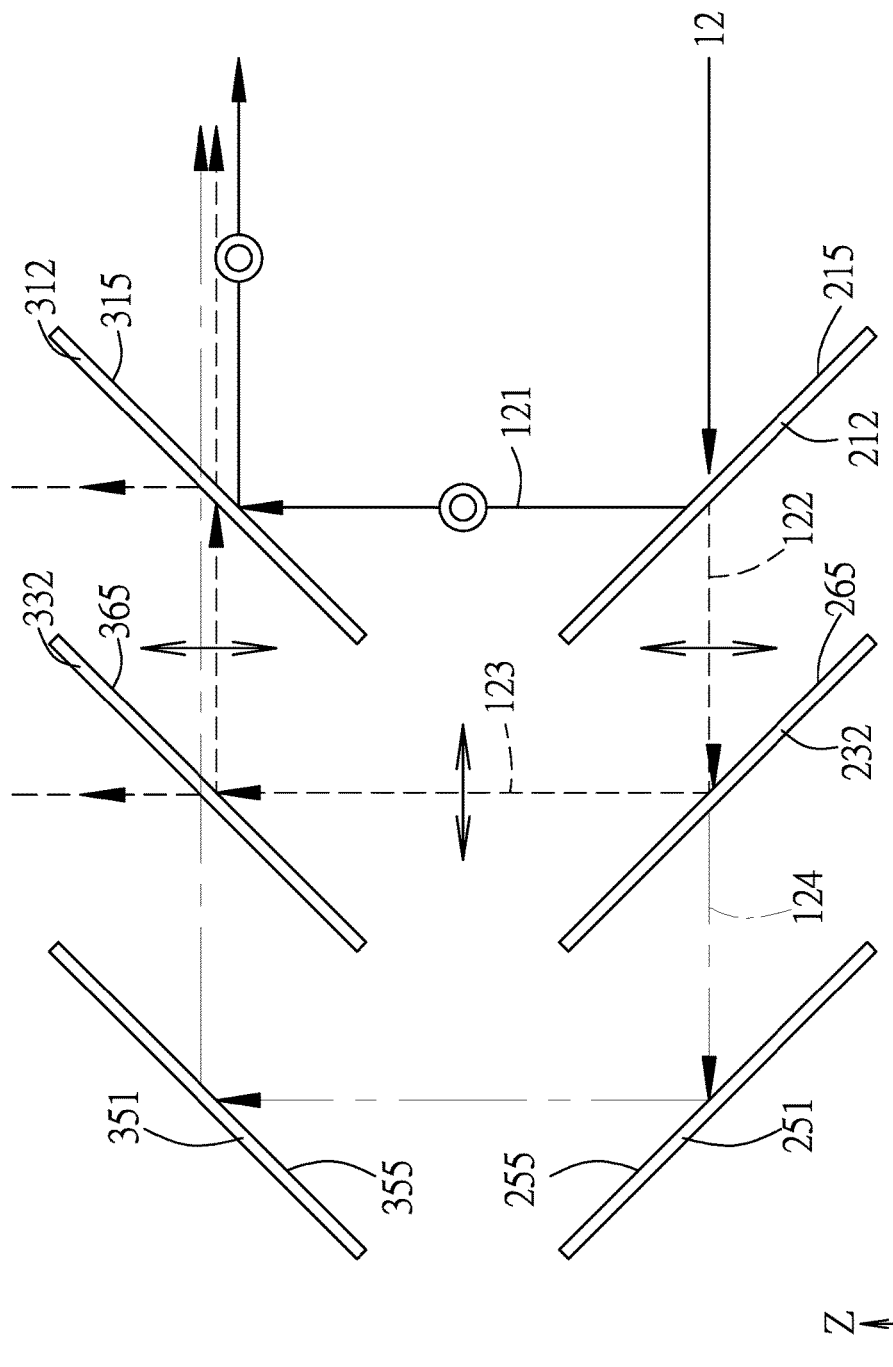
FIG. 39 is a diagram schematically showing light behavior, in the Y-direction, in a light regulation device of the ninth embodiment.
Figure 40:
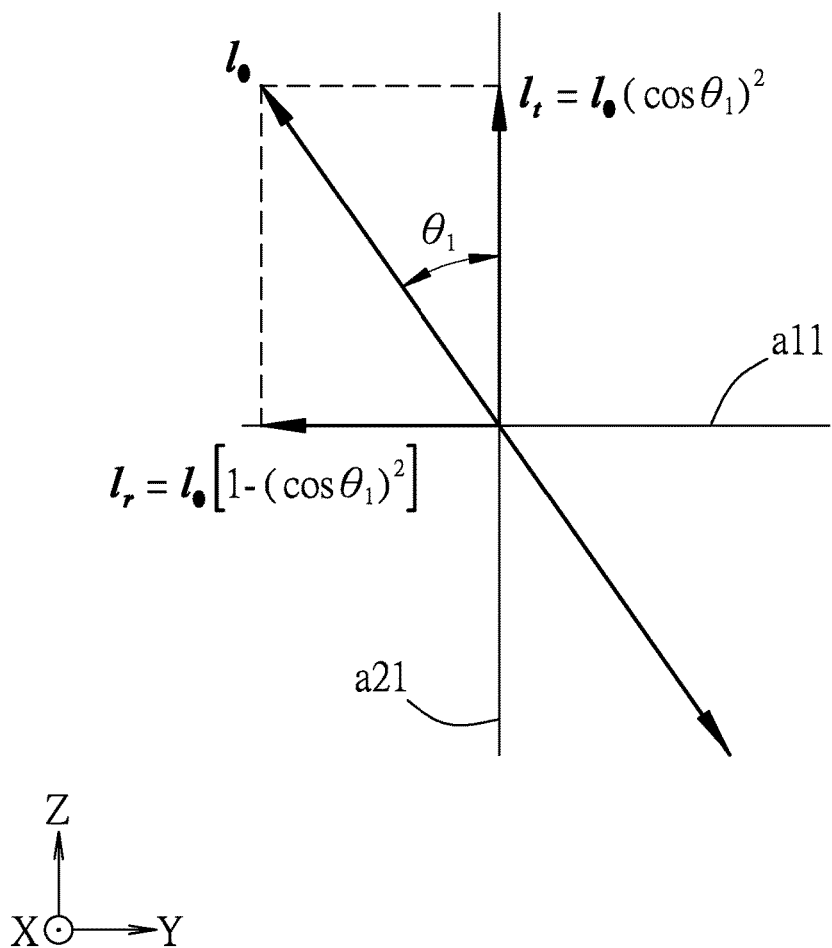
FIG. 40 illustrates an optical intensity relation between first and second light beams of the incident light of the ninth embodiment.
Figure 41:
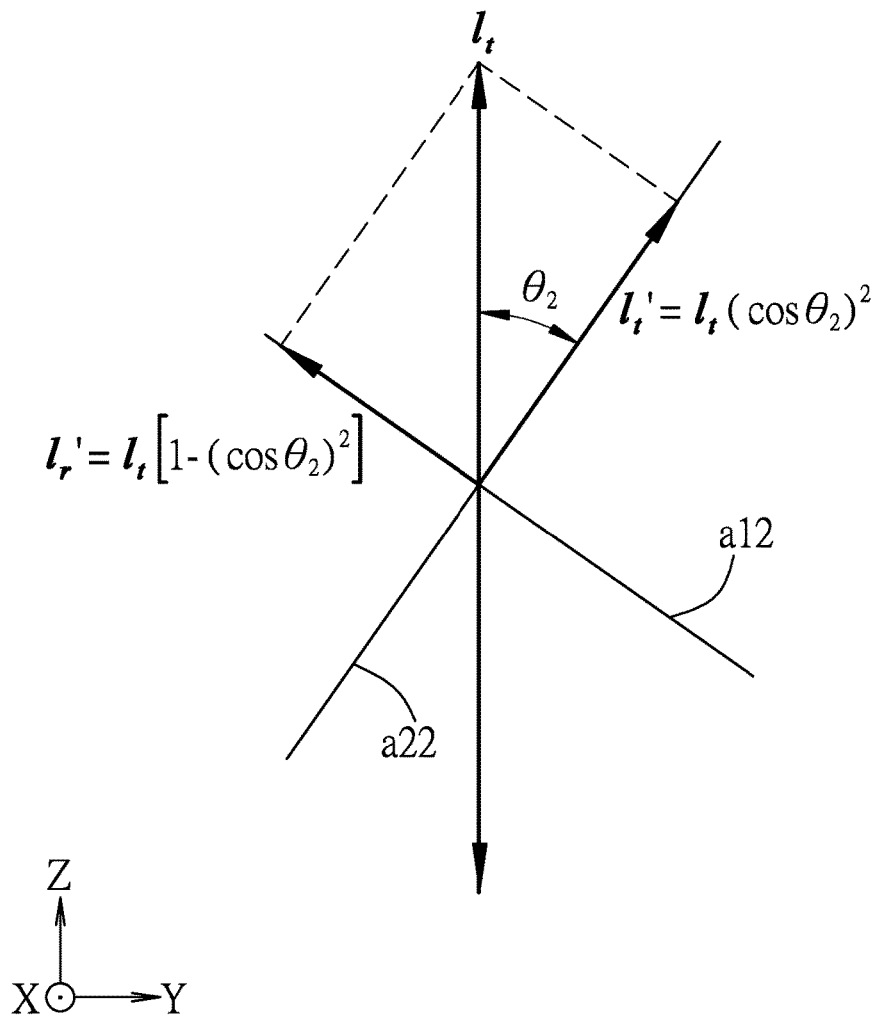
FIG. 41 illustrates an optical intensity relation between a third light beam and the other portion of the incident light of the ninth embodiment.

In this embodiment, the first transmission axis (a21) forms a first included angle ($\theta_1$) with a polarization direction of the incident light 12 (i.e., the linearly polarized light beam) (see FIG. 40). When the incident light 12 impinges on the first planar light splitter element 212, the incident light 12 is split into the first light beam 121 and the second light beam 122, and the polarization directions of the first light beam 121 and the second light beam 122 are perpendicular to each other, as shown in FIG. 39. From FIG. 40, the light energy of the incident light 12 is represented by $l_0$, the light energy of the first light beam 121 is represented by $l_r$, and the light energy of the second light beam 122 is represented by $l_t$, where $l_r = l_0 [1-(\cos \theta_1)^2]$ and $l_t = l_0 (\cos \theta_1)^2$.

It is noted that since the travelling direction and the polarization direction of the first light beam 121 may change slightly as a result of deflection effect of the first section 4 of the light deflection sheet 40 [i.e., the deflection angle pair $(+\alpha 1, -\alpha 1)$], when the first light beam 121 parallel to the second reflection axis (a11') impinges on the second planar light splitter element 312, most of the first light beam 121 is reflected by the second planar light splitter element 312 toward the light emitting surface. However, a light component having the light energy $l_{rs}$ may transmit the second planar light splitter element 312, thereby resulting in the light energy loss, where $l_{rs}=l_r (\sin \alpha 1)^2$ On the other hand, the third transmission axis (a22) forms a second included angle ($\theta_2$) with a polarization direction of the second light beam 122 (see FIG. 42). When the second light beam 122 impinges on the third planar light splitter element 232, the second light beam 122 is split into the third light beam 123 and the fourth light beam 124, and the polarization directions of the third light beam 123 and the fourth light beam 124 are perpendicular to each other, as shown in FIG. 39. From FIG. 41, the light energy of the third light beam 123 is represented by $l_r'$, and the light energy of the fourth light beam 124 is represented by $l_t'$, where $l_r'=l_t[1-(\cos \theta_2)^2]$ and $l_t'=l_t(\cos \theta_2)^2$.

Similarly, since the travelling direction and the polarization direction of the third light beam 123 may change slightly as a result of deflection effect of the second section 4' of the light deflection sheet 40 [i.e., the deflection angle pair (+$\alpha$2, −$\alpha$2)], when the third light beam 123 impinges on the fourth planar light splitter element 332, most of the third light beam 123 is reflected by the fourth planar light splitter element 332 toward the second planar light splitter element 312. However, a light component having the light energy $l_{rs}'$ may transmit the fourth planar light splitter element 332, thereby resulting in the light energy loss, where $l_{rs}'=l_r'(\sin \alpha 2)^2$.

After the fourth light beam 124 is reflected by the first and second planar light reflection elements 251, 351, and since the fourth transmission axis (a22') is parallel to the polarization direction of the fourth light beam 124, the fourth light beam 124 passes through the fourth planar light splitter element 332 and merges with the most of the third light beam 123 reflected by the fourth planar light splitter element 332. The fourth light beam 124 and the most of the third light beam 123 after merging can smoothly pass through the second planar light splitter element 312 and merge with the most of the first light beam 121 reflected by the second planar light splitter element 312.

In sum, due to the presence of the light regulation device 15, in the case where the incident light 12 is visible light, the angular intensity distribution for each light point in the surface light source can be varied by changing the deflection angle pair(s) (+$\alpha$1, −$\alpha$1), (+$\alpha$2, −$\alpha$2), (+$\alpha$3, −$\alpha$3) as needed, and an angular colored light distribution for each light point in the surface light source can also be varied by changing the splitting functions of the first and second planar light splitter elements 212, 312, and the third and fourth planar light splitter elements 232, 332 as needed, and in the case where the incident light 12 is linearly polarized light, an angular energy distribution for each light point in the surface light source can be varied by changing the deflection angle pair(s) (+$\alpha$1, −$\alpha$1), (+$\alpha$2, −$\alpha$2), (+$\alpha$3, −$\alpha$3) and the first and second included angles ($\theta_1$, $\theta_2$).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes structured together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A light regulation device, comprising:
   a first light guide structure having a light incident surface on which light in a first direction is incident as incident light;
   a second light guide structure opposite to said first light guide structure in a second direction, which is perpendicular to the first direction, and having a light emitting surface; and
   a light deflection sheet clamped between said first and second light guide structures and extending in a third direction perpendicular to the first and second directions, said light deflection sheet including a first light deflection layer;
   wherein all or a portion of the incident light is guided by said first light guide structure toward said light deflection sheet, is then deflected at least by said first light deflection layer to travel to said second light guide structure, and is substantially guided by said second light guide structure to emit through said light emitting surface; and
   wherein, when the portion of the incident light is guided by said first light guide structure toward said light deflection sheet, the other portion of the incident light is guided by said first light guide structure toward said second light guide structure, and is then guided by said second light guide structure to emit through said light emitting surface.

2. The light regulation device as claimed in claim 1, wherein:
   all or the portion of the incident light guided by said first light guide structure toward said light deflection sheet travels in the second direction; and
   said first light deflection layer includes a plurality of interconnected saw-toothed microstructures arranged in one of the first and third directions, each of said saw-toothed microstructures being an isosceles triangular prism body that extends in the other one of the first and third directions and that has first and second side surfaces forming an apex angle therebetween, and a third side surface adjacent to said first light guide structure and permitting all or the portion of the incident light incident thereon, said apex angle of each of said saw-toothed microstructures being one of a plurality of different angles, said saw-toothed microstructures being configured to refract all or the portion of the incident light passing through said third side surfaces of said saw-toothed microstructures from said first side surfaces, and said second side surfaces at at least one of a plurality of different deflection angle pairs with respect to the second direction, each of said deflection angle pairs being associated with a respective one of said angles and having positive and negative deflection angles of the same individual size.

3. The light regulation device as claimed in claim 2, wherein said light deflection sheet further includes an optical adhesive layer disposed between said first light deflection layer and said second light guide structure, and having a refractive index different from that of said first light deflection layer.

4. The light regulation device as claimed in claim 3, wherein
- said light deflection sheet further includes a second light deflection layer disposed between said first light deflection layer and said first light guide structure, said second light deflection layer including a plurality of interconnected wave-like microstructures arranged in the first direction, each of said wave-like microstructures being a concave lens body extending in the third direction; and
- all or the portion of the incident light is deflected by said wave-like microstructures of said second light deflection layer before it is incident on said third side surfaces of said saw-toothed microstructures of said first light deflection layer.

5. The light regulation device as claimed in claim 4, wherein:
- said light incident surface of said first light guide structure, and said light emitting surface of said second light guide structure are perpendicular to the first direction;
- said first light guide structure includes
  - a first planar light splitter element disposed adjacent to said light incident surface in the first direction and positioned in a manner that said first planar light splitter element is inclined so as to be closer to said light deflection sheet as being farther from the light incident surface, said first planar light splitter element being configured to split the incident light into a first light beam included in the portion of the incident light, and a second light beam including the other portion of the incident light, to reflect the first light beam in the second direction toward said light deflection sheet such that the first light beam is deflected by said light deflection sheet at said at least one of said deflection angle pairs with respect to the second direction, and to permit passage of the second light beam in the first direction therethrough, and
  - a first planar light reflection element disposed distal from said light incident surface in the first direction and positioned parallel to said first planar light splitter element, said first planar light reflection element being configured to reflect the second light beam in the second direction toward said light deflection sheet or said second light guide structure such that the second light beam is deflected by said light deflection sheet at said at least one of the deflection angle pairs with respect to the second direction when the second light beam is reflected toward said light deflection sheet or such that the second light beam travels in the second direction when the second light beam is reflected toward said second light guide structure, or reflect the other portion of the incident light toward said light deflection sheet or said second light guide structure such that the other portion of the incident light is deflected by said light deflection sheet at said at least one of said deflection angle pairs with respect to the second direction when the other portion of the incident light is reflected toward said light deflection sheet or such that the other portion of the incident light travels in the second direction when the other portion of the incident light is reflected toward said second light guide structure; and
- said second light guide structure includes
  - a second planar light splitter element disposed adjacent to said light emitting surface in the first direction, similar to said first planar light splitter element in splitting functions, and positioned in a manner that said second planar light splitter element is inclined so as to be closer to said light deflection sheet as being farther from said light emitting surface and is symmetrical to said first planar light splitter element with respect to said light deflection sheet, said second planar light splitter element being configured to reflect toward said light emitting surface all or most of the first light beam deflected by said light deflection sheet such that all or most of the first light beam reflected by said second planar light splitter element is emitted from said light emitting surface at said at least one of said deflection angle pairs with respect to the first direction, and
  - a second planar light reflection element disposed distal from said light emitting surface in the first direction, positioned parallel to said second planar light splitter element and symmetrical to said first planar light reflection element with respect to said light deflection sheet, said second planar light reflection element being configured to reflect toward said second planar light splitter element the second light beam or the other portion of the incident light deflected by said light deflection sheet such that the second light beam or the other portion of the incident light reflected by said second planar light reflection element passes through said second planar light splitter element and is then emitted from said light emitting surface at said at least one of the deflection angle pairs with respect to the first direction, or reflect toward said second planar light splitter element the second light beam or the other portion of the incident light reflected by said first planar light reflection element in the second direction such that the second light beam or the other portion of the incident light reflected by said second planar light reflection element travels in the first direction, passes through said second planar light splitter element and is emitted from said light emitting surface.

6. The light regulation device as claimed in claim 5, wherein the first light beam is the portion of the incident light, and the second light beam is the other portion of the incident light.

7. The light regulation device as claimed in claim 5, wherein:
- said first light guide structure further includes a third planar light splitter element disposed between said first planar light splitter element and said first planar light reflection element in the first direction, positioned parallel to said first planar light splitter element, and different from said first planar light splitter element in splitting functions, said third planar light splitter element being configured to split the second light beam passing through said first planar light splitter element in the first direction into a third light beam cooperating with the first light beam to constitute the portion of the incident light, and the other portion of the incident light, to reflect the third light beam in the second direction toward said light deflection sheet such that the third light beam is deflected by said light deflection sheet at said at least one of said deflection angle pairs with respect to the second direction, and to permit passage of the other portion of the incident light in the first direction therethrough; and said second light guide structure further includes a fourth planar light splitter element disposed between said second planar light splitter element and said second planar light reflection element in the first direction, positioned parallel to said second planar light splitter element, symmetrical to said third planar deflection element with respect to said light deflection sheet, and similar to said third planar light splitter element in splitting functions, said fourth planar light splitter element being configured to reflect all or most of the third light beam deflected by said light deflection sheet such that all or most of the third light beam reflected by said fourth planar light splitter element passes through said first planar light splitter element and is emitted from said light emitting surface at said at least one of said deflection angle pairs with respect to the first direction, and to permit passage of the other portion of the incident light reflected by said first planar light reflection element.

8. The light regulation device as claimed in claim 7, wherein:

each of said first and second planar light splitter elements is a dichroic splitter film for reflecting one of red light, green light and blue light such that the first light beam is a light beam of said one of red light, green light and blue light and such that said second planar light splitter element reflects all of the first light beam deflected by said light deflection sheet; and each of said third and fourth planar light splitter elements is a dichroic splitter film for reflecting another one of red light, green light and blue light such that the third light beam is a light beam of said another one of red light, green light and blue light and such that said fourth planar light splitter element reflects all of the third light beam deflected by said light deflection sheet.

9. The light regulation device as claimed in claim 7, the incident light being a linearly polarized light beam, wherein:

each of said first to fourth planar light splitter elements is a linear polarization splitter element;

said first planar light splitter element has a first reflection axis parallel to the third direction, and a first transmission axis perpendicular to the first reflection axis;

said second planar light splitter element has a second reflection axis parallel to the third direction, and a second transmission axis perpendicular to the second reflection axis, and reflects most of the first light beam deflected by said light deflection sheet;

said third planar light splitter element has a third reflection axis inclined to the second and third directions, and a third transmission axis perpendicular to the third reflection axis;

said fourth planar light splitter element has a fourth reflection axis inclined to the second and third directions, and a fourth transmission axis perpendicular to the fourth reflection axis, and reflects most of the third light beam deflected by said light deflection sheet; and said first transmission axis is configured to form a first included angle with a polarization direction of the incident light, and said third transmission axis is configured to form a second included angle with a polarization direction of the second light beam.

10. The light regulation device as claimed in claim 7, wherein said first light guide structure further includes a light intensity regulator disposed between said first and third planar light splitter elements and configured to regulate the light intensity of the second light beam toward said third planar light splitter element.

11. The light regulation device as claimed in claim 7, wherein said first light guide structure further includes a light intensity regulator disposed between said third planar light splitter element and said first planar light reflection element, and configured to regulate the light intensity of the other portion of the incident light toward said first planar light reflection element.

12. A backlight module comprising:

a light supply unit configured to produce incident light in a first direction;

a light guide plate opposite to said light supply unit in a second direction perpendicular to the first direction and having a light entry end surface, a light exit side surface distal from said light supply unit in the second direction, and a light guide side opposite to said light exit side surface in the second direction and adjacent to said light supply unit and formed with a plurality of interconnected sawtooth-shaped ridges that are arranged in the first direction and that extend in a third direction perpendicular to the first and second directions; and a light regulation device including a first light guide structure having a light incident surface attached to said light supply unit for receiving said incident light produced thereby, a second light guide structure opposite to said first light guide structure in the second direction and having a light emitting surface attached to said light entry end surface of said light guide plate, and a light deflection sheet clamped between said first and second light guide structures and extending in the third direction, said light deflection sheet including a first light deflection layer;

wherein all or a portion of said incident light is guided by said first light guide structure toward said light deflection sheet, is then deflected at least by said first light deflection layer to travel to said second light guide structure, and is substantially guided by said second light guide structure to emit through said light emitting surface so as to enter said light entry end surface of said light guide plate;

wherein, when the portion of said incident light is guided by said first light guide structure toward said light deflection sheet, the other portion of said incident light is guided by said first light guide structure toward said second light guide structure, and is then guided by said second light guide structure to emit through said light emitting surface so as to enter said light entry end surface of said light guide plate; and all or most of said incident light regulated by said light regulation device in deflection with respect to the first direction and entering said light entry end surface of said light guide plate is guided by said light guide plate to emit a surface light source from said light exit side surface.

13. The backlight module as claimed in claim 12, wherein:

all or the portion of the incident light guided by said first light guide structure toward said light deflection sheet travels in the second direction; and said first light deflection layer includes a plurality of interconnected saw-toothed microstructures arranged in one of the first and third directions, each of said saw-toothed microstructures being an isosceles triangular prism body that extends in the other one of the first and third directions and that has first and second side surfaces forming an apex angle therebetween, and a third side surface adjacent to said first light guide structure and permitting all or the portion of the incident light incident thereon, said apex angle of each of said saw-toothed microstructures being one of a plurality of different angles, said saw-toothed microstructures being configured to refract all or the portion of the incident light passing through said third side surfaces of said saw-toothed microstructures from said first side surfaces and said second side surfaces at at least one of a plurality of different deflection angle pairs with respect to the second direction, each of said deflection angle pairs being associated with a respective one of said angles and having positive and negative deflection angles of the same individual size.

14. The backlight module as claimed in claim 13, wherein said light deflection sheet further includes a first optical adhesive layer disposed between said first light deflection layer and said second light guide structure, and having a refractive index different from that of said first light deflection layer.

15. The backlight module as claimed in claim 14, wherein:
said light deflection sheet further includes a second light deflection layer disposed between said first light deflection layer and said first light guide structure, said second light deflection layer including a plurality of interconnected wave-like microstructures arranged in the first direction, each of said wave-like microstructures being a concave lens body extending in the third direction; and
all or the portion of the incident light is deflected by said wave-like microstructures of said second light deflection layer before it is incident on said third side surfaces of said saw-toothed microstructures of said first light deflection layer.

16. The backlight module as claimed in claim 15, wherein:
said light incident surface of said first light guide structure, and said light emitting surface of said second light guide structure are perpendicular to the first direction;
said first light guide structure includes
a first planar light splitter element disposed adjacent to said light incident surface in the first direction and positioned in a manner that said first planar light splitter element is inclined so as to be closer to said light deflection sheet as being farther from the light incident surface, said first planar light splitter element being configured to split the incident light into a first light beam included in the portion of the incident light, and a second light beam including the other portion of the incident light, to reflect the first light beam in the second direction toward said light deflection sheet such that the first light beam is deflected by said light deflection sheet at said at least one of said deflection angle pairs with respect to the second direction, and to permit passage of the second light beam in the first direction therethrough, and
a first planar light reflection element disposed distal from said light incident surface in the first direction and positioned parallel to said first planar light splitter element, said first planar light reflection element being configured to reflect the second light beam in the second direction toward said light deflection sheet or said second light guide structure such that the second light beam is deflected by said light deflection sheet at said at least one of the deflection angle pairs with respect to the second direction when the second light beam is reflected toward said light deflection sheet or such that the second light beam travels in the second direction when the second light beam is reflected toward said second light guide structure, or reflect the other portion of the incident light toward said light deflection sheet or said second light guide structure such that the other portion of the incident light is deflected by said light deflection sheet at said at least one of said deflection angle pairs with respect to the second direction when the other portion of the incident light is reflected toward said light deflection sheet or such that the other portion of the incident light travels in the second direction when the other portion of the incident light is reflected toward said second light guide structure; and said second light guide structure includes
a second planar light splitter element disposed adjacent to said light emitting surface in the first direction, similar to said first planar light splitter element in splitting functions, and positioned in a manner that said second planar light splitter element is inclined so as to be closer to said light deflection sheet as being farther from said light emitting surface and is symmetrical to said first planar light splitter element with respect to said light deflection sheet, said second planar light splitter element being configured to reflect toward said light emitting surface all or most of the first light beam deflected by said light deflection sheet such that all or most of the first light beam reflected by said second planar light splitter element is emitted from said light emitting surface at said at least one of said deflection angle pairs with respect to the first direction, and
a second planar light reflection element disposed distal from said light emitting surface in the first direction, positioned parallel to said second planar light splitter element and symmetrical to said first planar light reflection element with respect to said light deflection sheet, said second planar light reflection element being configured to reflect toward said second planar light splitter element the second light beam or the other portion of the incident light deflected by said light deflection sheet such that the second light beam or the other portion of the incident light reflected by said second planar light reflection element passes through said second planar light splitter element and is then emitted from said light emitting surface at said at least one of the deflection angle pairs with respect to the first direction, or reflect toward said second planar light splitter element the second light beam or the other portion of the incident light reflected by said first planar light reflection element in the first direction such that the second light beam or the other portion of the incident light reflected by said second planar light reflection element travels in the first direction, passes through said second planar light splitter element and is emitted from said light emitting surface.

17. The backlight module as claimed in claim 16, wherein said first light beam is the portion of said incident light, and said second light beam is the other portion of said incident light.

18. The backlight module as claimed in claim 16, wherein:
- said first light guide structure further includes a third planar light splitter element disposed between said first planar light splitter element and said first planar light reflection element in the first direction, positioned parallel to said first planar light splitter element, and different from said first planar light splitter element in splitting functions, said third planar light splitter element being configured to split the second light beam passing through said first planar light splitter element in the first direction into a third light beam cooperating with the first light beam to constitute the portion of the incident light, and the other portion of the incident light, to reflect the third light beam in the second direction toward said light deflection sheet such that the third light beam is deflected by said light deflection sheet at said at least one of said deflection angle pairs with respect to the second direction, and to permit passage of the other portion of the incident light in the first direction therethrough; and
- said second light guide structure further includes a fourth planar light splitter element disposed between said second planar light splitter element and said second planar light reflection element in the first direction, positioned parallel to said second planar light splitter element, symmetrical to said third planar light splitter element with respect to said light deflection sheet, and similar to said third planar light splitter element in splitting functions, said fourth planar light splitter element being configured to reflect all or most of the third light beam deflected by said light deflection sheet such that all or most of the third light beam reflected by said fourth planar light splitter element passes through said first planar light splitter element and is emitted from said light emitting surface at said at least one of said deflection angle pairs with respect to the first direction, and to permit passage of the other portion of the incident light reflected by said second planar light reflection element.

19. The backlight module as claimed in claim 18, wherein:
- each of said first and second planar light splitter elements is a dichroic splitter film for reflecting one of red light, green light and blue light such that the first light beam is a light beam of said one of red light, green light and blue light and such that said second planar light splitter element reflects all of the first light beam deflected by said light deflection sheet; and
- each of said third and fourth planar light splitter elements is a dichroic splitter film for reflecting another one of red light, green light and blue light such that the third light beam is a light beam of said another one of red light, green light and blue light and such that said fourth planar light splitter element reflects all of the third light beam deflected by said light deflection sheet.

20. The backlight module as claimed in claim 18, wherein:
- said incident light produced by said light supply unit is a linearly polarized light beam;
- each of said first to fourth planar light splitter elements is a linear polarization splitter element;
- said first planar light splitter element has a first reflection axis parallel to the third direction, and a first transmission axis perpendicular to the first reflection axis;
- said second planar light splitter element has a second reflection axis parallel to the third direction, and a second transmission axis perpendicular to the second reflection axis, and reflects most of the first light beam deflected by said light deflection sheet;
- said third planar light splitter element has a third reflection axis inclined to the second and third directions, and a third transmission axis perpendicular to the third reflection axis;
- said fourth planar light splitter element has a fourth reflection axis inclined to the second and third directions, and a fourth transmission axis perpendicular to the fourth reflection axis, and reflects most of the third light beam deflected by said light deflection sheet; and
- said first transmission axis is configured to form a first included angle with a polarization direction of the incident light, and said third transmission axis is configured to form a second included angle with a polarization direction of the second light beam.

21. The backlight module as claimed in claim 18, wherein said first light guide structure further includes a light intensity regulator disposed between said first and third planar light splitter elements and configured to regulate the light intensity of the second light beam toward said third planar light splitter element.

22. The backlight module as claimed in claim 18, wherein said first light guide structure further includes a light intensity regulator disposed between said third planar light splitter element and said first planar light reflection element, and configured to regulate the light intensity of the other portion of the incident light toward said first planar light reflection element.

23. The backlight module as claimed in claim 12, wherein said light supply unit includes:
- a light beam generator configured to generate an input light beam in the first direction; and a light intensity regulator having an input side attached to said light beam generator for receiving said input light beam generated thereby, and an output side attached to said light incident surface of said first light guide structure, said light intensity regulator being configured to regulate the light intensity of said input light beam so as to emit said incident light from said output side.

* * * * *